United States Patent
Roan et al.

(10) Patent No.: US 11,762,425 B1
(45) Date of Patent: Sep. 19, 2023

(54) DISPLAY ASSEMBLY

(71) Applicant: Art Guild, Inc., West Deptford, NJ (US)

(72) Inventors: Joseph Michael Roan, Media, PA (US); Konrad Giersz, Philadelphia, PA (US); Ivan Letinic, Manalapan, NJ (US)

(73) Assignee: Art Guild, Inc., West Deptford, NJ (US)

( * ) Notice: Subject to any disclaimer, the term of this patent is extended or adjusted under 35 U.S.C. 154(b) by 239 days.

(21) Appl. No.: 16/874,028

(22) Filed: May 14, 2020

Related U.S. Application Data

(63) Continuation-in-part of application No. 16/737,611, filed on Jan. 8, 2020, now Pat. No. 11,164,487.

(60) Provisional application No. 62/885,501, filed on Aug. 12, 2019.

(51) Int. Cl.
  *G09F 1/10* (2006.01)
  *G06F 1/16* (2006.01)
  *G09F 13/04* (2006.01)

(52) U.S. Cl.
  CPC .......... *G06F 1/1637* (2013.01); *G06F 1/1616* (2013.01); *G09F 13/04* (2013.01)

(58) Field of Classification Search
  CPC ............. G09F 13/04; G09F 2007/1804; G09F 2007/183; G09F 2007/1843; G09F 7/22; G09F 13/0413; G09F 13/0431; G09F 11/02
  See application file for complete search history.

(56) References Cited

U.S. PATENT DOCUMENTS

| | | | |
|---|---|---|---|
| 3,947,987 A | 4/1976 | Allen | |
| 4,064,904 A | 12/1977 | Tolnai | |
| 5,116,204 A | 5/1992 | Power | |
| 5,315,776 A | 5/1994 | Strawbridge et al. | |
| 5,482,238 A | 1/1996 | Kreiter | |
| 5,562,459 A | 10/1996 | Durlach | |
| 5,688,042 A * | 11/1997 | Madadi | F21V 3/00 362/240 |
| 5,822,900 A * | 10/1998 | Armstrong | G09F 11/025 40/473 |
| 6,594,930 B1 | 7/2003 | Segan et al. | |
| 7,131,619 B2 * | 11/2006 | Krapf | A47F 5/025 40/431 |
| 7,823,307 B2 | 11/2010 | Gibbs | |
| 2004/0134110 A1 | 7/2004 | Konny | |
| 2008/0209780 A1* | 9/2008 | Gibbs | G09F 11/02 40/446 |
| 2009/0056183 A1* | 3/2009 | Reiland | G02B 6/006 40/564 |
| 2012/0112034 A1 | 5/2012 | Harris | |
| 2013/0069800 A1 | 3/2013 | Kosedag | |
| 2018/0142846 A1 | 5/2018 | Liu | |

(Continued)

FOREIGN PATENT DOCUMENTS

| | | |
|---|---|---|
| KR | 20-0394339 | 8/2005 |
| KR | 10-1186847 | 10/2012 |
| KR | 10-1862764 | 5/2018 |

*Primary Examiner* — Gary C Hoge
(74) *Attorney, Agent, or Firm* — Volpe Koenig

(57) ABSTRACT

A display unit is supported by the mobile and stationary mounts that are rotatable with respect to each other about a common support. The mounts include undulating pattern between them that enables to move relative to each other.

10 Claims, 31 Drawing Sheets

(56) References Cited

U.S. PATENT DOCUMENTS

2020/0152097 A1\* 5/2020 Yumoto ................ G02B 27/06
2021/0134193 A1\* 5/2021 Pan ........................ F21V 21/00

\* cited by examiner

DISPLAY ASSEMBLY

CROSS REFERENCE TO RELATED APPLICATIONS

This application is a continuation-in-part of U.S. patent application Ser. No. 16/737611, filed on Jan. 8, 2020, which claims the benefit U.S. Provisional Application No. 62/885,501 filed on Aug. 12, 2019, which is incorporated by reference as if fully set forth.

FIELD OF INVENTION

The invention relates generally to a display assembly. More particularly, the invention relates to a multi-piece display assembly that is movable. Most particularly, the invention relates to a movable multi-piece display assembly that has back lighting to illuminate the display.

BACKGROUND

There are a number of known devices for advertising and displaying merchandise. While some of the known display assemblies have found acceptance, there remains a need for a flexible system that is aesthetically pleasing, attention grabbing, and user friendly.

SUMMARY

The Applicant's disclosure provides an attention grabbing and aesthetically pleasing display assembly that incorporates flexibility in the display itself and in lighting the display. The display assembly includes a support on which a display unit is mounted. The mounting is achieved by securing one mount to the display and securing another mount to the support and resting the display mount on the mount secured to the support. The two mounts are free to move relative to each other and render the display unit movable. The two mounts may have undulating mating surfaces which will cause the display unit to move vertically on the support as well as rotating about the support. The display unit can be mobile about the support by moving the first mount relative to the second mount.

The support is preferably tubular and of sufficient length to position the display unit at a desired height. The support preferably includes a number of preconfigured locations or positions where a mount may be secured to the support. In addition, the support preferably includes at least one position or location where a lighting element that selectively backlights the display unit can be secured.

BRIEF DESCRIPTION OF THE DRAWINGS

The following detailed description will be better understood when read in conjunction with the appended drawings, which wherein:

FIG. 32 is an exploded view of follower in FIG. 31 one part of the and

DETAILED DESCRIPTION

Figure 1:
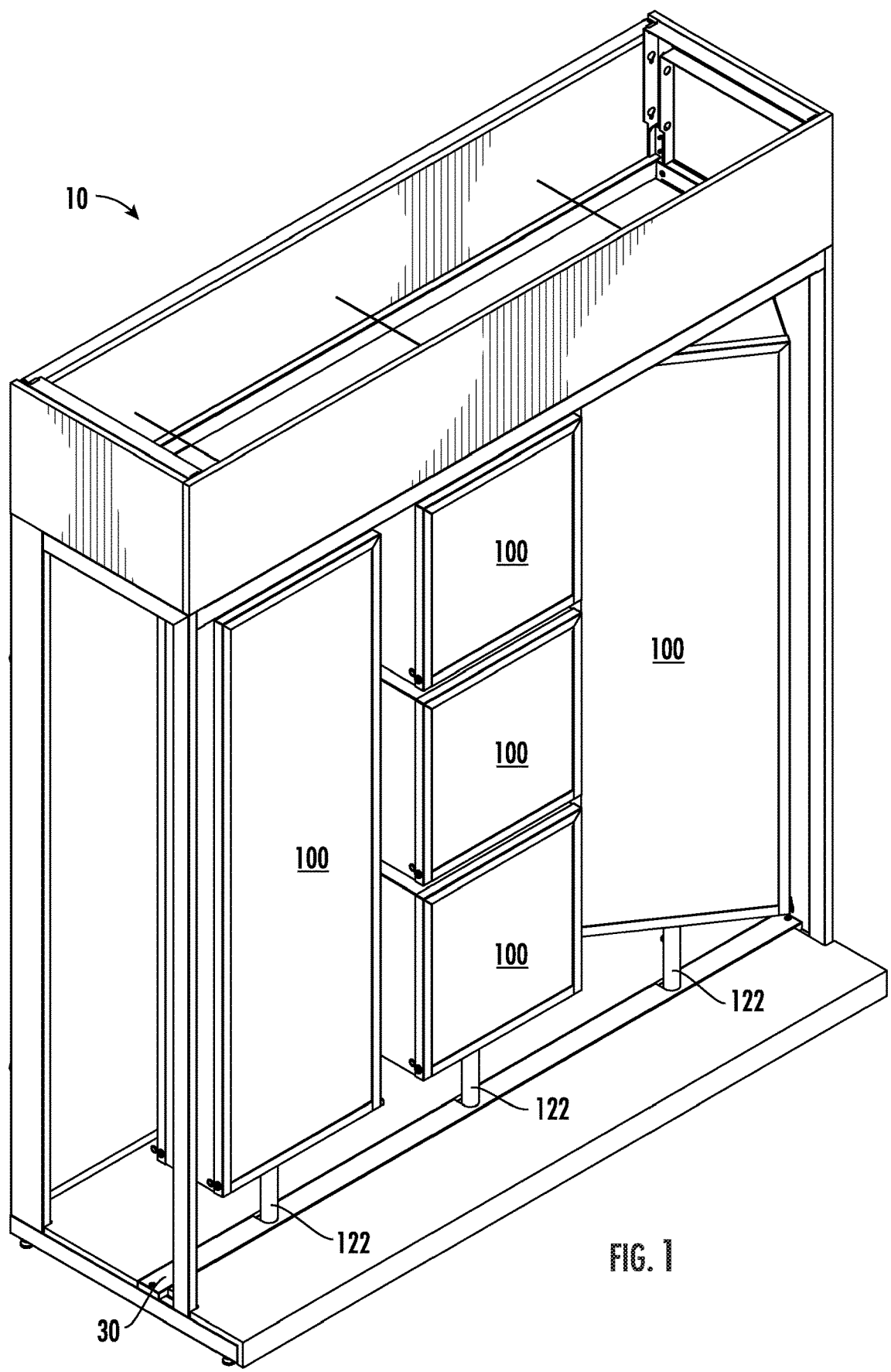
FIG. 1 illustrates a display that incorporates multiple display assemblies according to the presently preferred display units.

With reference now to FIG. 1, there is illustrated a display 10 that includes multiple display units 100. Each of the display units 100 in FIG. 1 has the same structural features and they differ only in their size. The display units 100 are mounted on a support 120. The support 120 may be secured directly to a floor or with a bottom brace 30 in the event the floor is not suitable. There may be a corresponding top brace 20, visible in FIG. 2, for securing the upper end of the support 120. The display units 100 are preferable movable about the support 120 and have back lighting, see FIGS. 2 and 3.

Figure 2:
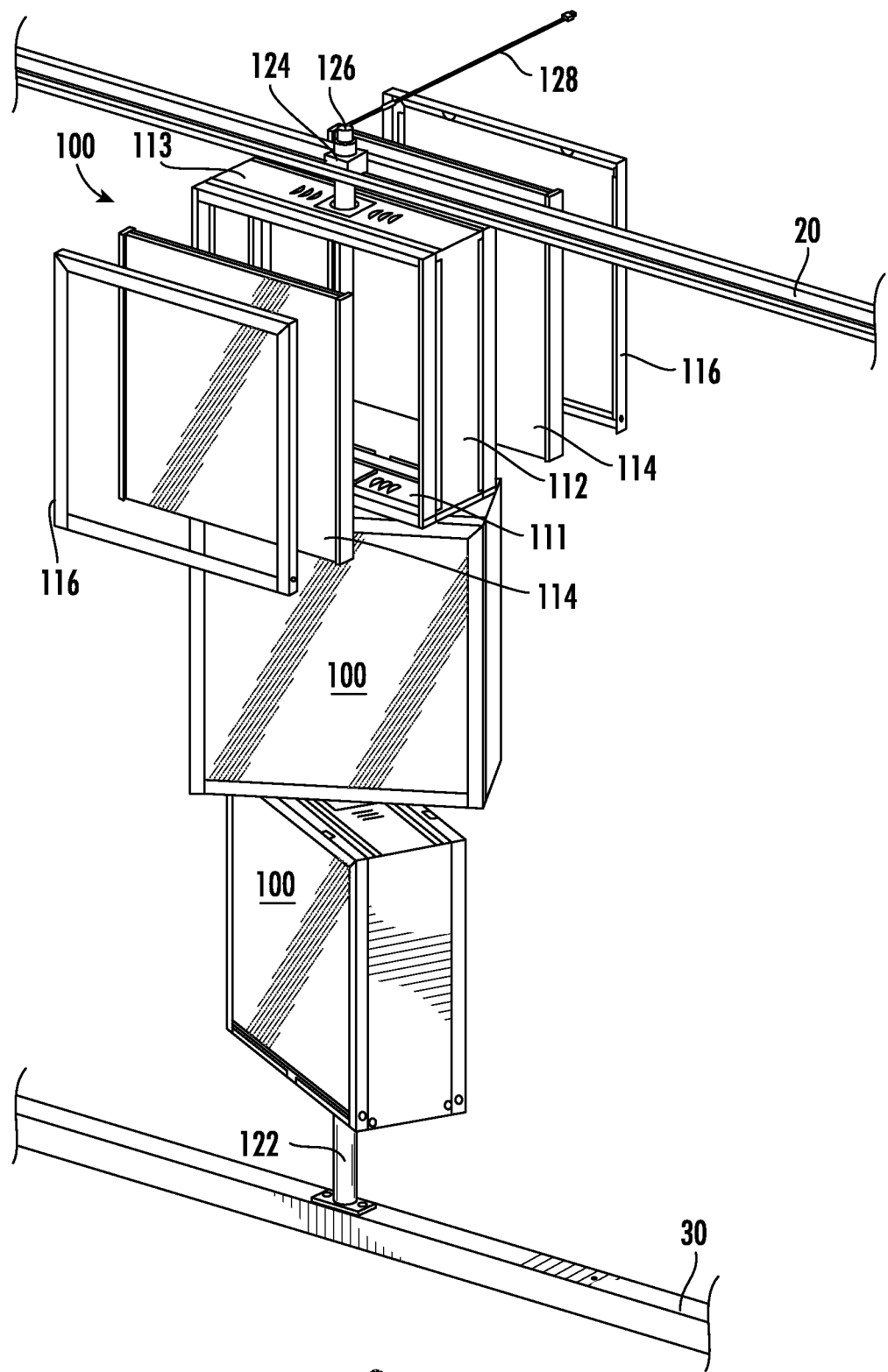
FIG. 2 illustrates one display assembly from FIG. 1 with a display unit shown in an exploded view.

FIG. 2 illustrates the three display units 100 in FIG. 1 with an exploded view of a display unit 100. The relationship of the support 120, bottom mount 122, top mount 124, top brace 20 and a bottom brace 30 can be seen in FIGS. 2 and 3.

As shown in FIG. 2, a display unit 100 includes a frame 112, shown as rectangular in FIG. 2 for the purpose of illustration; however, the frame 112 may be any geometric shape that can be mounted on a support 120. When the display unit 100 is completed and ready for installation, the support 120 extends through the bottom 111 and top 113 of the frame 112. The frame 112 receives at least one graphic display 114, and preferably two graphic displays 114, when it is in a rectangular configuration. Each graphic display 114 is inserted into an open face of the frame 112 and the surround 116 fits over the graphic display 114 and is connected to the frame 112 to secure the graphic display 114 in the frame 112. The surround 116 is akin to a picture frame and it gives the display unit 100 a finished look and enables display changes to be made easily within the same fame 112.

Figure 3:
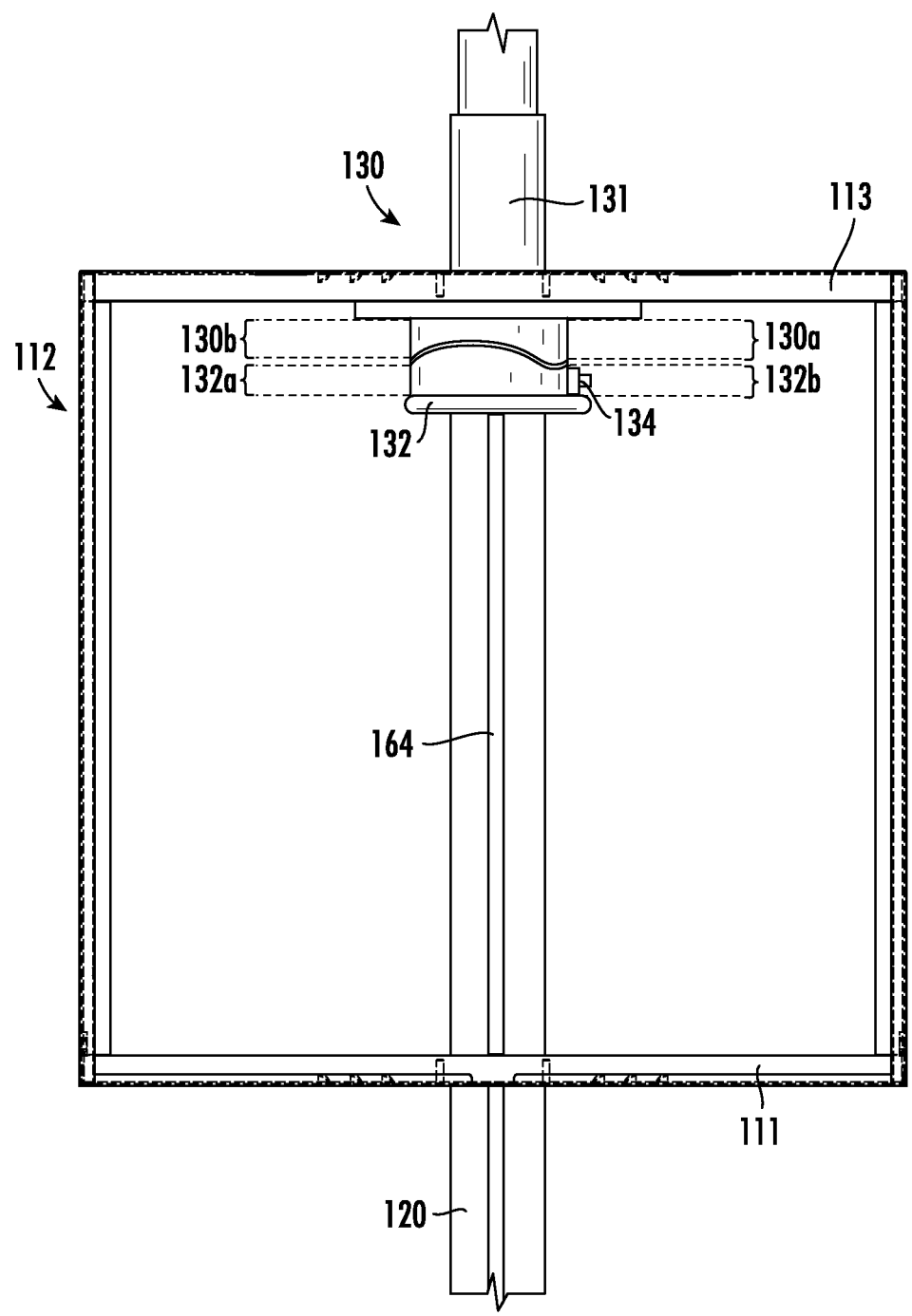
FIG. 3 illustrates the interior of a display unit.
Figure 15:
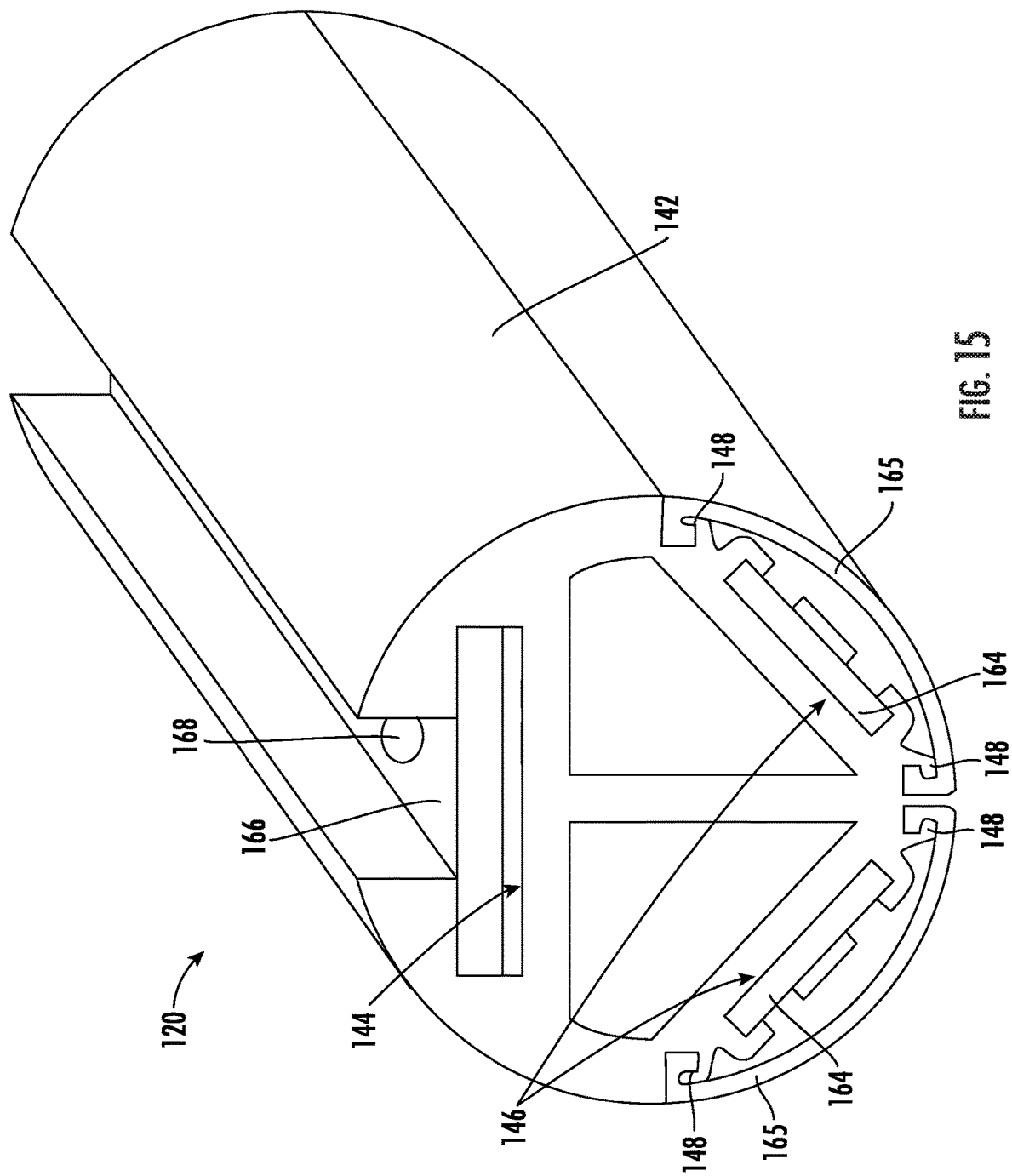
FIG. 15 illustrates a support usable with the display units.
Figure 16:
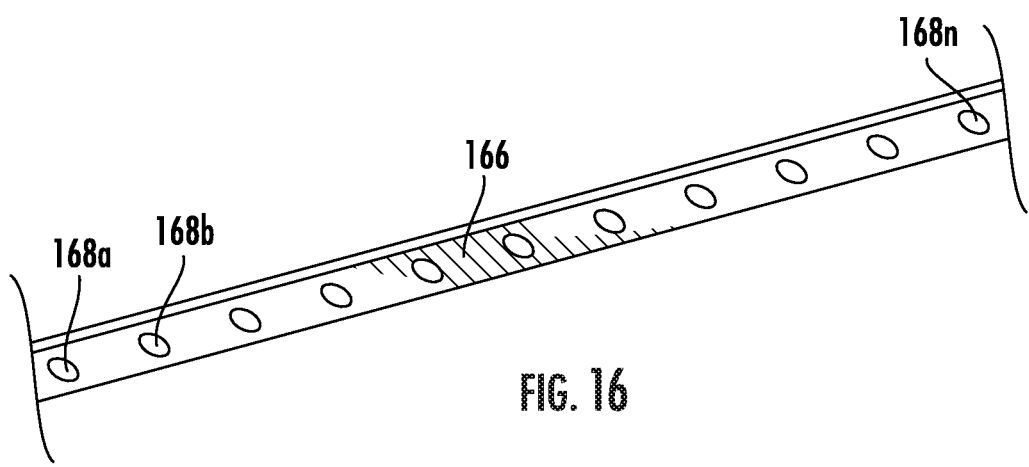
FIG. 16 illustrates a locator strip usable with the support of FIG. 15.

With reference to FIG. 3, each display unit 100 preferable includes an illumination source that back lights the graphic display 114. The illumination source is preferable a lengthwise LED light strip 164, which is low powered and produces minimum heat in the graphic display 114. The electrical leads or wires 128 associated with light strip 164 are routed through an end cap 126, shown in FIG. 16, which is inserted in the support 120. The end cap 126 provides a wire chase to organize the wires 128 associated with the light strip 164. Suitable LED light strips are available from National Lighting, 16826 Edwards Road, Cerritos, CA 90703; http://www.nationallighting.com. As shown in FIGS. 15 and 16, the locator strip 166 fits into a slot in support 120 and provides multiple locations or positions where the display 100 can be secured to the support 120. Further details of these components will be provided hereinafter in connection with FIGS. 15-17.

FIG. 3 illustrates a frame 112 mounted on a support 120. The frame 112 is connected to a first mount 130, which preferably includes a sleeve 131 that extends through the frame 112. The sleeve 131 isolates the light from the lighting element 164 within the display unit 100 and provides a finished cover over the support 120. The first mount 130 is not fastened to the support 120 but is configured to mate with a stationary second mount 132 that is fastened to the support 120 in a selected location along the locator strip 166. The two mounts 130 and 132 may have planar mating surfaces but it is preferred that they have non-planar or undulating mating surfaces. In either case, the mating surfaces make the frame 112 rotatable about the support 120. With the undulating surfaces, the first mount 130 also moves vertically when rotated on the second mount 132.

Figure 4:
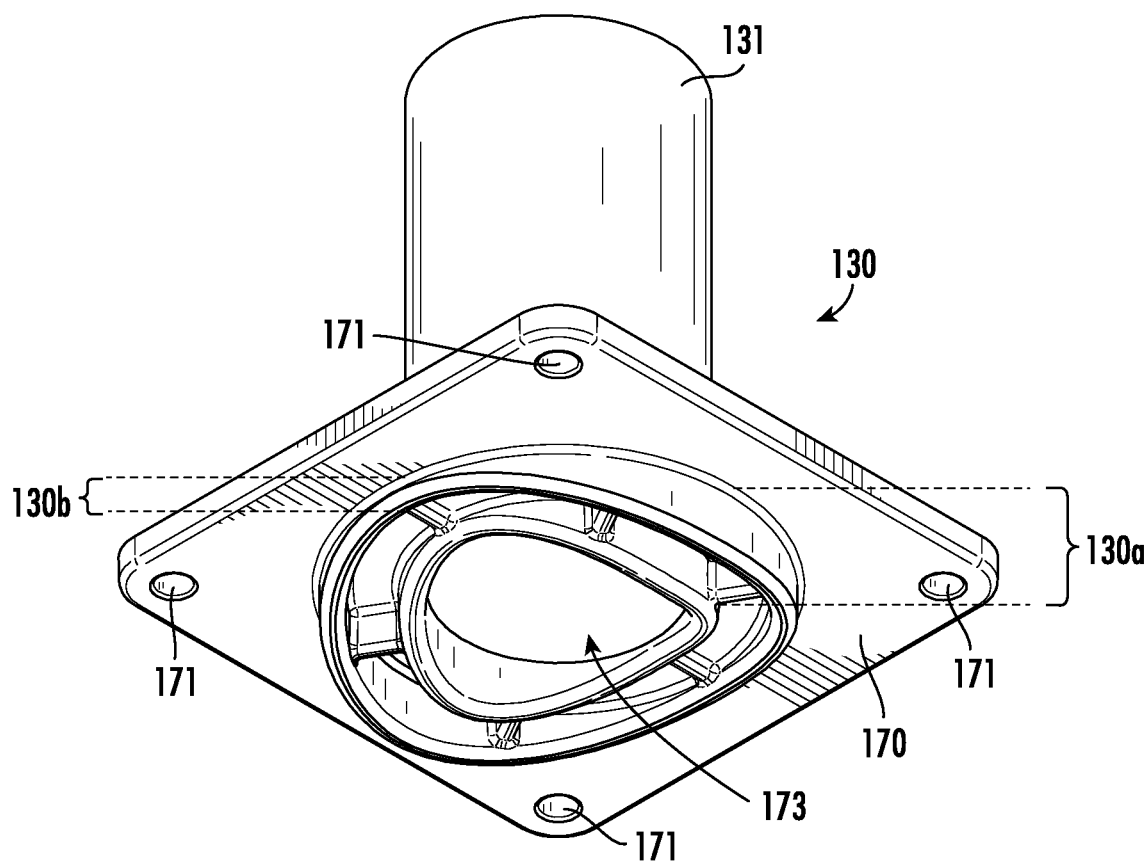
FIG. 4 illustrates a mount usable for attachment to a display unit.
Figure 5:
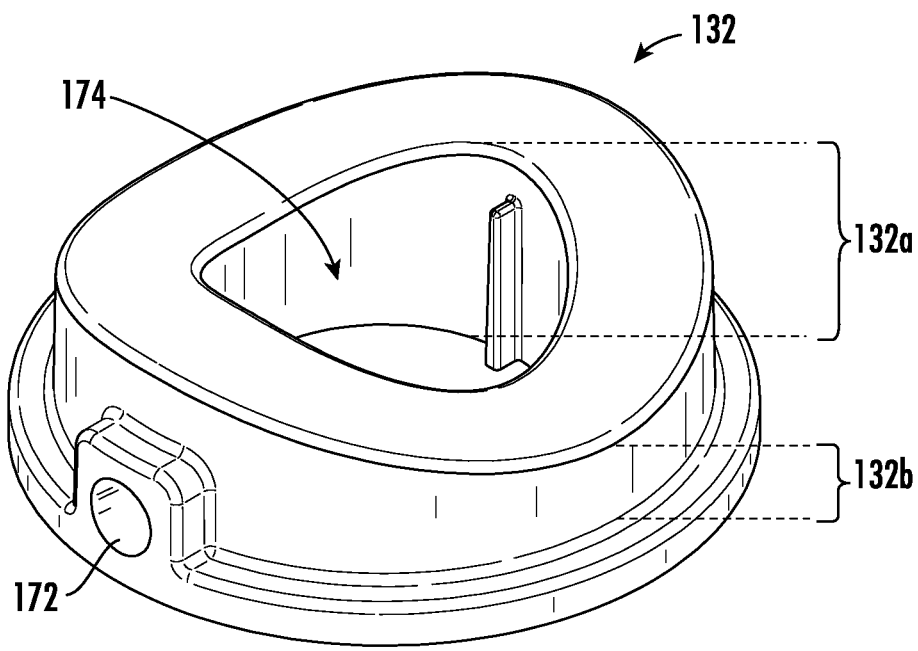
FIG. 5 illustrates a mount usable for securing a display unit to a support.

As the display unit 100 rotates, the first mount 130 that is attached to the frame 112 moves on the undulating surface of the stationary second mount 132. The movement between the first mount 130 and the second mount 132 will raise and lower the frame 112 with the rotation around the support 120. With reference to FIGS. 4 and 5, the first mount 130 and the second mount 132 will be explained in more detail. FIG. 4 illustrates a configuration for the first mount 130 that is configured to index at 180 degrees and FIG. 5 illustrates a complementary configuration for the second mount 132.

As shown in FIG. 4, the first mount 130 includes a plate 170 with an opening 173 so that the support 120 can enter and extend through the sleeve 131. The plate 170 includes a plurality of apertures 171 for fasteners that secure the mount 130 to the underside of the top 113 of the frame 112, as shown in FIG. 3. FIG. 4 also shows the wave pattern of the surface with two crests 130a and two valleys 130b that are spaced apart to index at 180 degrees.

FIG. 5 shows the corresponding second mount 132 with an opening 174 to allow the support 120 to extend through it. The stationary second mount 132 includes an aperture 172 for a fastener 134, shown in FIG. 3, which connects with a selected location aperture 168 among the plurality of apertures 168a-n on locator strip 166, see FIG. 16, to secure the second mount 132 to the support 120. The surface of the second mount 132 preferably has a wave pattern that corresponds to the first mount 130. FIG. 5 shows the wave pattern with two crests 132a and two valleys 132b that are spaced apart to index at 180 degrees.

Figure 6:
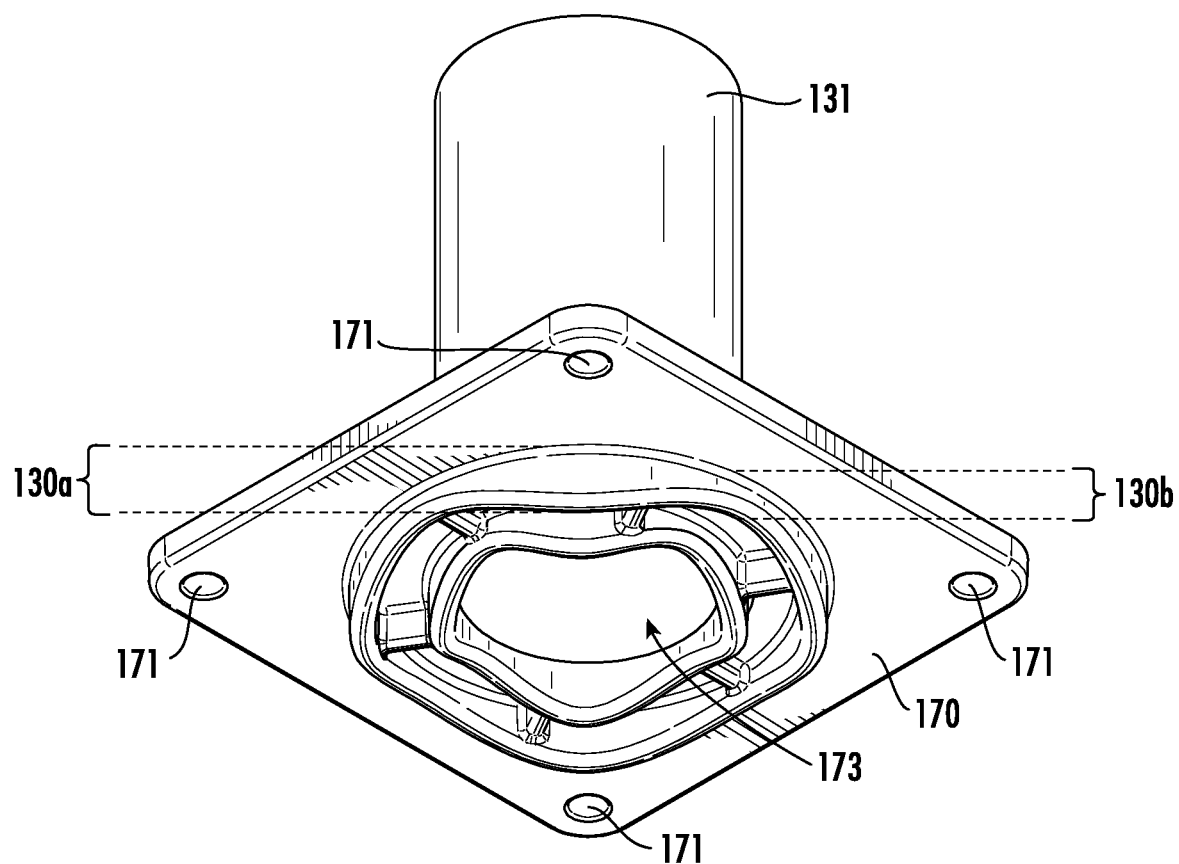
FIG. 6 illustrates an alternative mount usable for attachment to a display unit.
Figure 7:
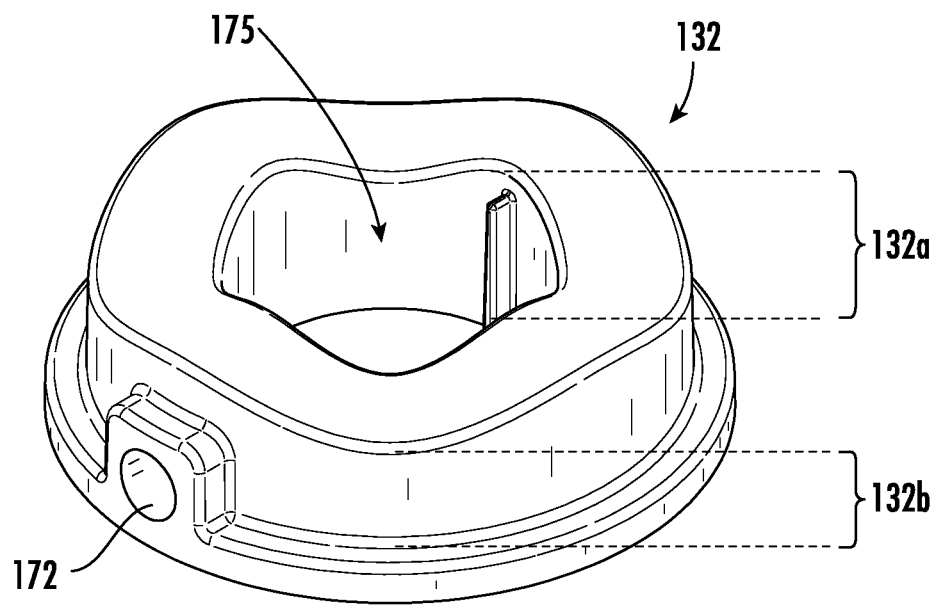
FIG. 7 illustrates an alternative second mount usable for securing a display unit to a support.

FIGS. 6-7 show configurations for the moveable mount 130 and stationary second mount 132 where the undulations, or crest 130a, 132a and valleys 130b, 132b, are more frequent and will result in the display unit 100 rotating at 90 degree increments. It will be understood that the undulations can be configured to cause the rotation to be 45 degrees, 60 degrees, or other degrees in accordance with the display unit 100 and the number of face or views that are desired.

Figure 8:
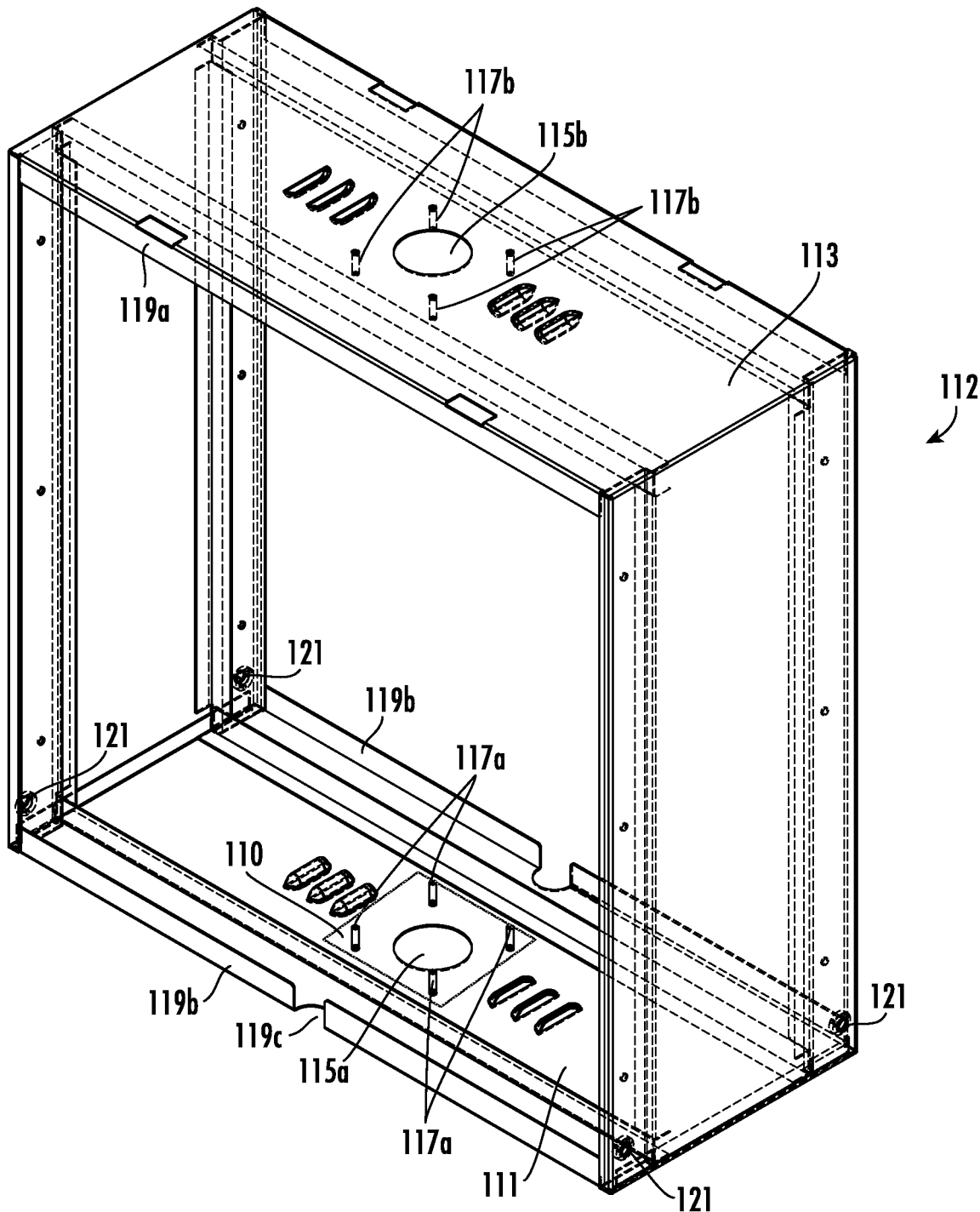
FIG. 8 illustrates the frame of FIG. 3 without any mount or support.

FIG. 8 illustrates the frame 112 apart from the support 120. The frame 112 includes an opening 115a in the bottom 111 and an opening 115b in the top 113. The opening 115a is dimensioned to receive a sleeve that covers the support 120 that is associated with another display unit 100 or is a separator between two displays mounted on the same support 120. When the frame 112 is the bottommost display unit 100, the opening 115a can receive a bottom mount 122.

Figure 9:
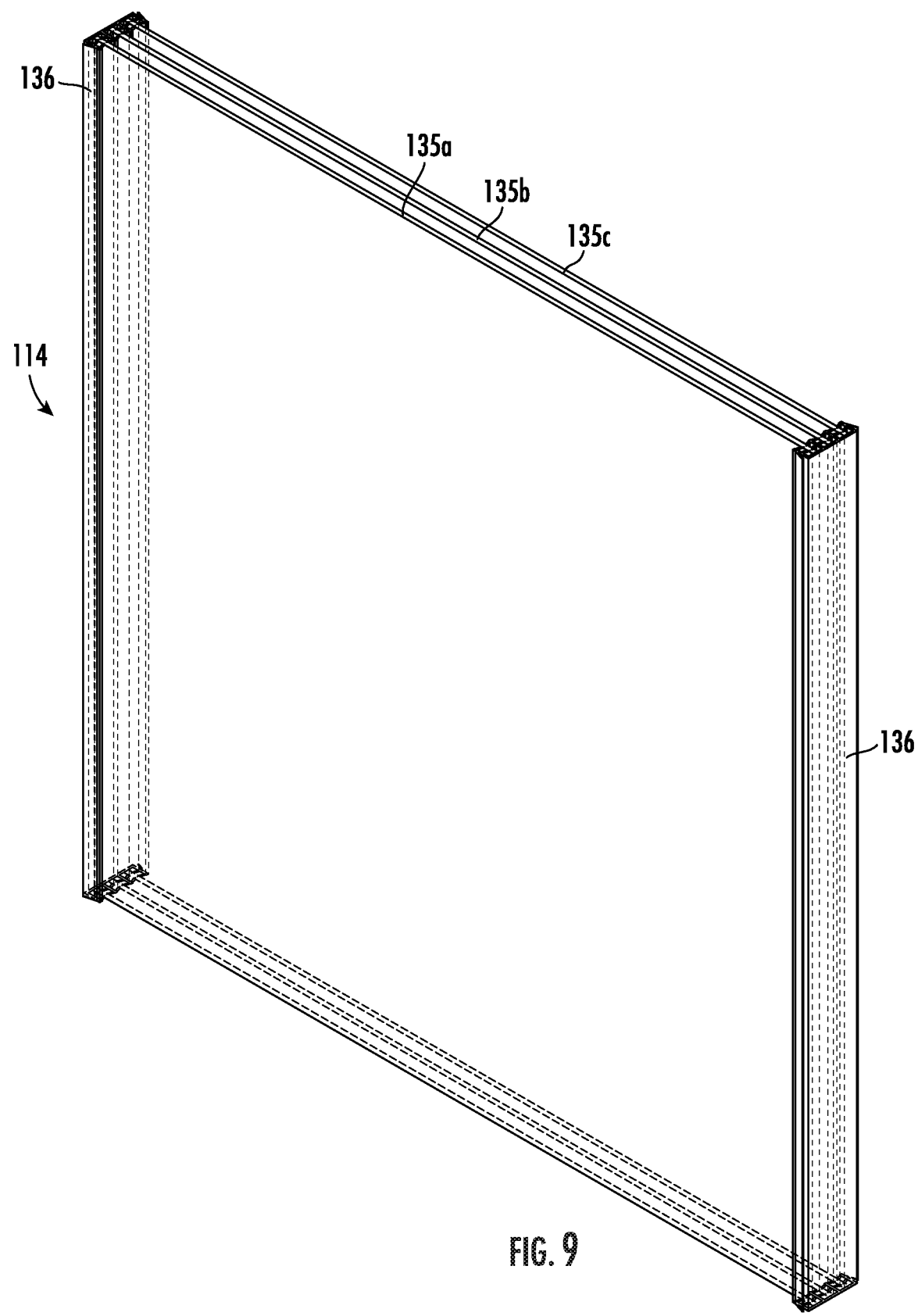
FIG. 9 illustrates a graphic display assembly useable with the frame of FIG. 8.
Figure 10:
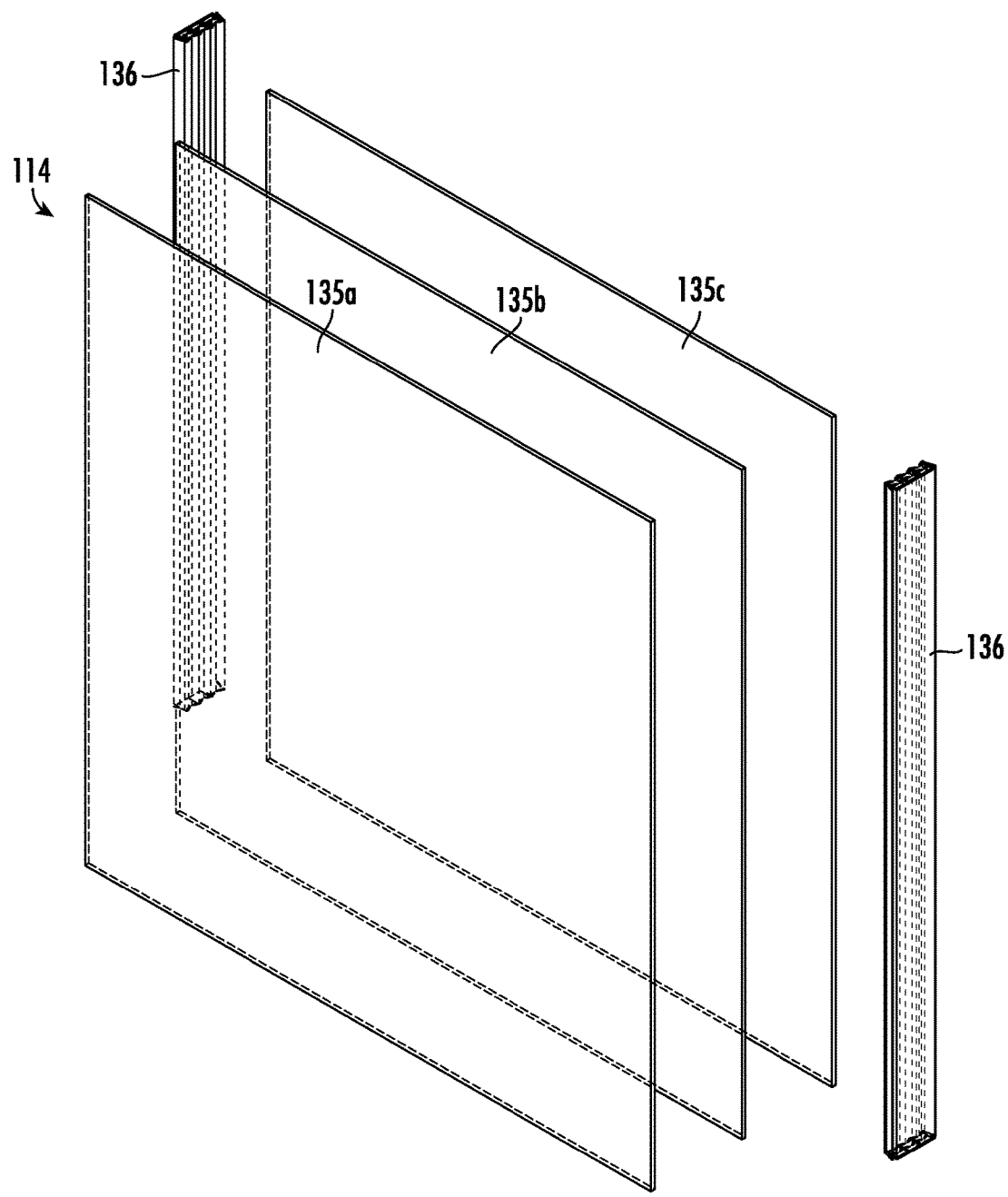
FIG. 10 is an exploded view of the graphic display assembly in FIG. 9.
Figure 11:
FIG. 11 is a top view of the graphic display assembly in FIG. 9.

In order to protect the structural integrity of the frame 112 it is often desired to attach a plate 110 around the unprotected opening 115a or 115b as shown in FIG. 8. The plate 110 may be attached with fasteners through apertures 117a, 117b in the frame 112. It is more typical to use the plate 110 on the bottom 111 of frame 112 because the upper mount, see FIG. 6, typically has a plate 170 and sleeve 131 that provide the desired protection. Still with reference to FIG. 8, the outer edges of the frame 112 include a lip or flange 119a, 199b that is dimensioned to receive a graphic display 114 as illustrated in FIGS. 9-11. An assembled graphic display can be inserted in the frame 112 raising it under the upper flange 119a and lowering it into flange 119b. The graphic display can be removed by pushing up at the recess 119c.

A preferred technique for assembling a graphic display 114 is illustrated in FIGS. 9-13. In the exemplary graphic display 114 of FIGS. 9-13, three panels 135a-c, are illustrated; however, it will be understood that the desired number of panels will depend on the desired graphics. The panels 135a-c are preferably a material having sufficient strength to be self-supporting to carry any form of message that includes text or graphics. The ends of the individual panels 135a-c are secured by at least two holders 136.

Figure 12:
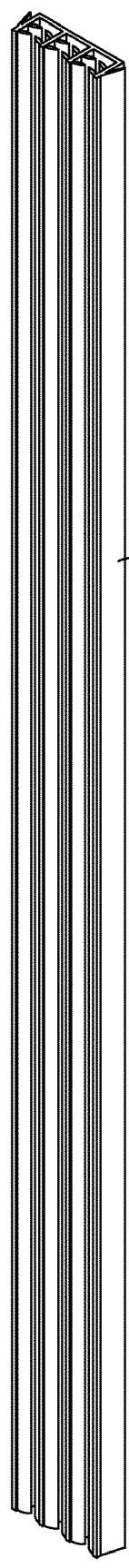
FIG. 12 illustrates an assembly fixture useable for holding the display panels in FIGS. 9 and 10.
Figure 13:
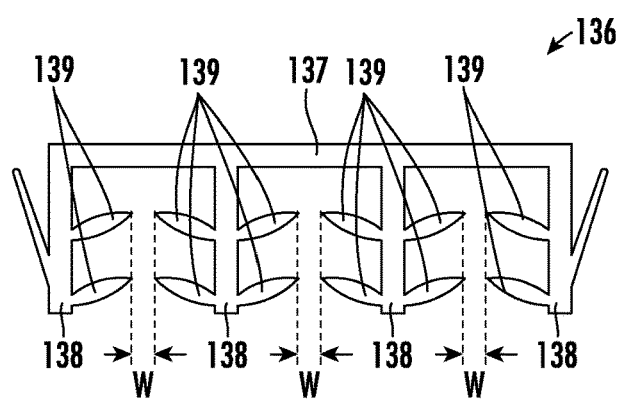
FIG. 13 is a top view of the assembly fixture in FIG. 12.

FIGS. 12-13 show further details of the holder 136. FIG. 12 illustrates a holder 136 for three panels 135. As shown in FIG. 9, the holder 136 will have an outer lip or edge that is dimensioned to complement the flanges 119a and 119b of the frame 112. With reference to FIG. 13, the holder 136 includes a base 137 and at least two protruding prongs 138. The number of prongs 138 should correspond to the desired number of panels 135 in the graphic display 114. In this configuration, the prongs 138 are more or less evenly spaced; however, the spacing can be altered to obtain a desired effect in the display unit 100 and the dimensions of a given panel 135. The fingers 139 on adjacent prongs 138 are spaces by a distance W that is slightly less than the width of the selected panel 135a-c so the panel 135a-c pushes the fingers 139 in an interference fit that provides a gripping force to hold the panel 135a-c.

Figure 14:
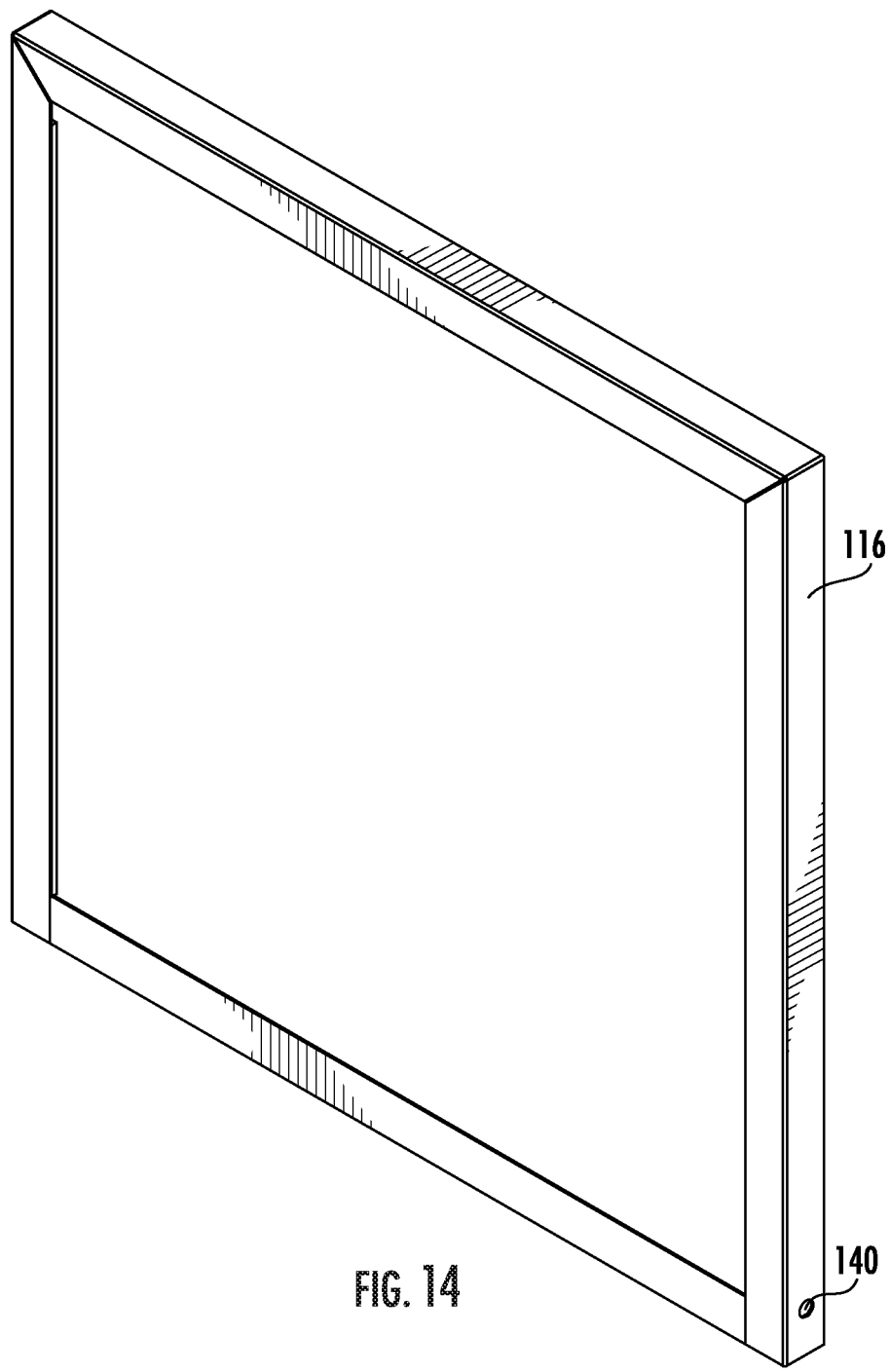
FIG. 14 illustrates a surround usable with the display units in FIG. 2.

FIG. 14 illustrates a surround 116 that is similar to a picture frame and connects to the frame 112 to retain an installed graphic display 114. The surround 116 preferably includes apertures 140 that align with the apertures 121 in the frame 112 so it can be attached and detached for access to the graphic display 114. If accessibility is not a desired feature, the surround 116 may be adhered to the frame 112.

As discussed previously, the panels 135a-c are preferably backlit by a lighting strip 164 in the support 120. FIG. 15 illustrates details of a support 120 that is configured to hold two lighting strips 164 in channels 146, a locator strip 166 in a channel 144, and two lenses 165 over the light strips 164 are retained by the slotted fingers 148. The lens 165 may be a simple dispersing lens or it may have specific effects to enhance the backlighting of the display unit 100. Since the remaining portion 142 of support 120 is solid, it can be customized with additional channels for any desired configuration of the assembly.

FIG. 16 illustrates a locator strip 166 for insertion into the channel 144 with a plurality of apertures 168a-n that define location points for securing a fixed mount 132 associated with a display unit 100 on the support 120. The fastener 134 of the mount 132 shown in FIG. 3 engages with one of the plurality of apertures 168a-n to secure it in the desired position on the support 120. The specific aperture 168 used to secure the mount 132 will be selected based on a desired position or vertical location of the display unit 100 on the support 120.

Figure 17:
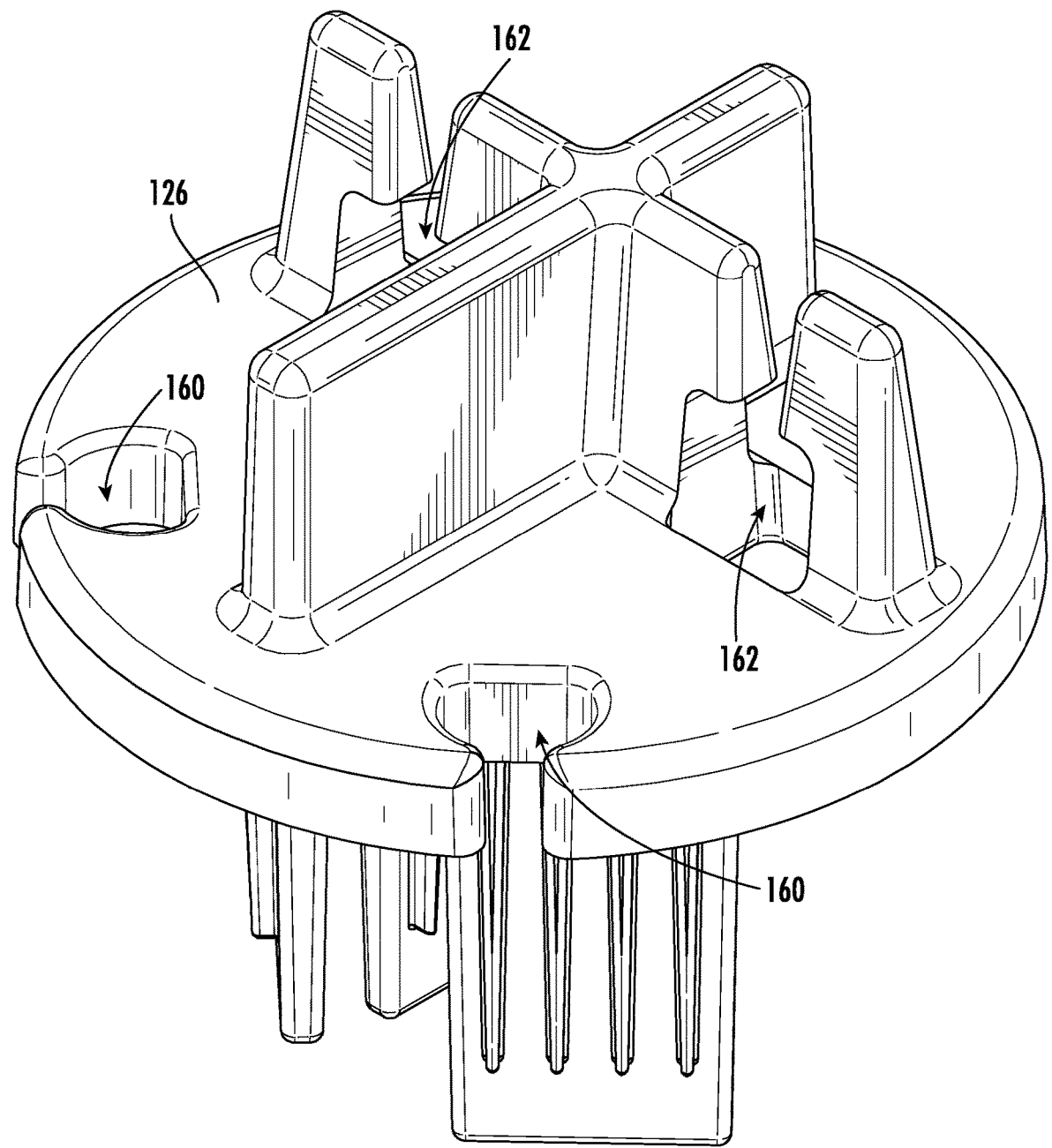
FIG. 17 illustrates a cap for closing an end of the support in FIG. 15.

FIG. 17 illustrates a preferred end cap 126 for closing the support 120. The end cap 126 is dimensioned for an interference fit with the open end of the support 120. In addition to closing the end of the support 120, the cap 126 provides wire chases or routes, 160 and 162, for collecting and directing the wires 128 associated with the lighting strips 164, as illustrated in FIG. 2.

Figure 18:
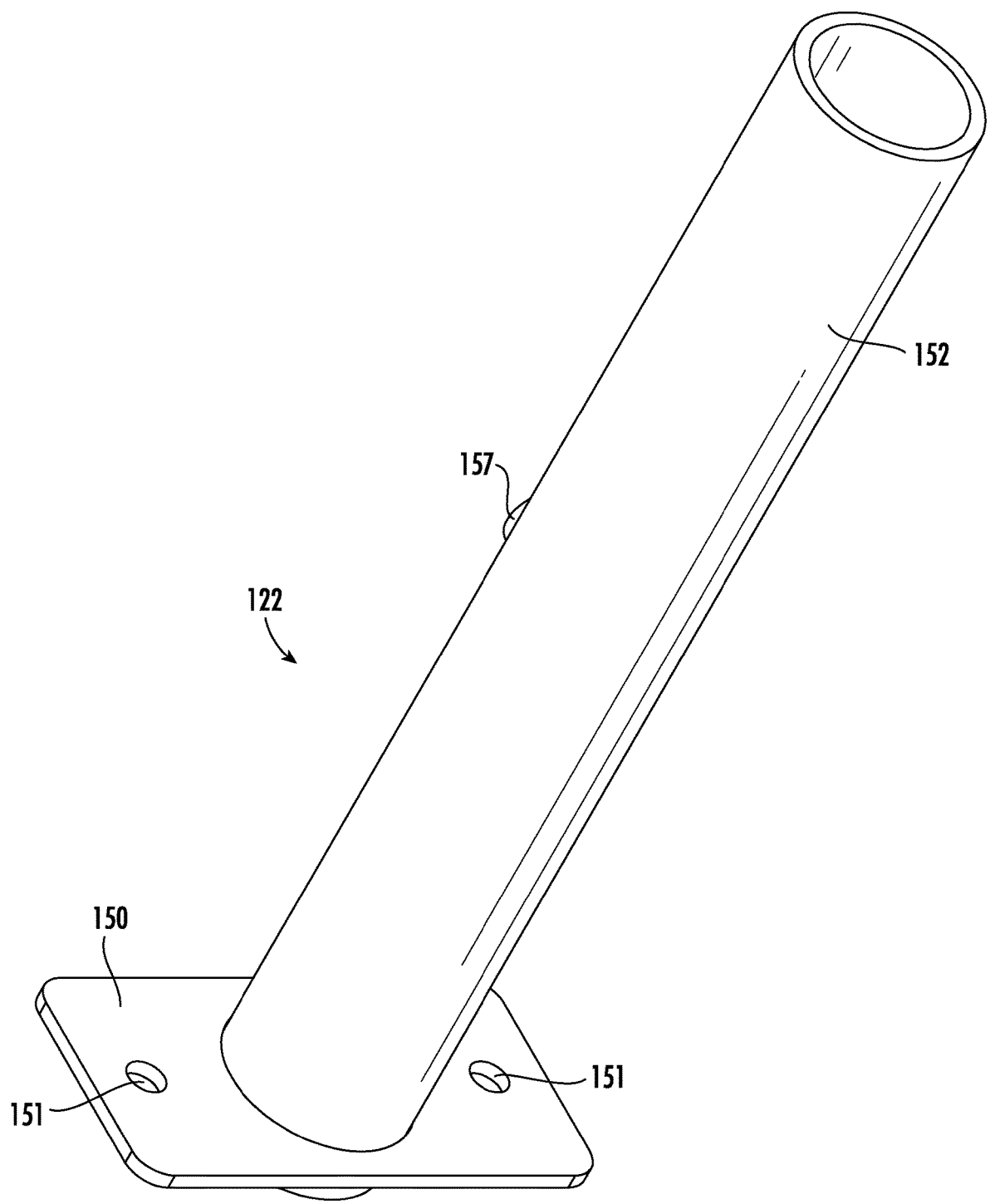
FIG. 18 illustrates a mount usable for securing a display assembly such as that shown in FIG. 1.

FIG. 18 illustrates a mount 122 for securing the bottom of the support 120, such as illustrated in FIG. 2. The bottom mount 122 includes a base plate 150 and a sleeve 152 dimensioned to fit snuggly over the support 120 and the length of sleeve 152 is selected according the potentially exposed support 120. The apertures 151 for fasteners may be provided in any number according to the application and the weight of the display to be secured. If desired, an aperture 157 may be provided for a fastener to secure the mount 122 to the support 120.

Figure 19:
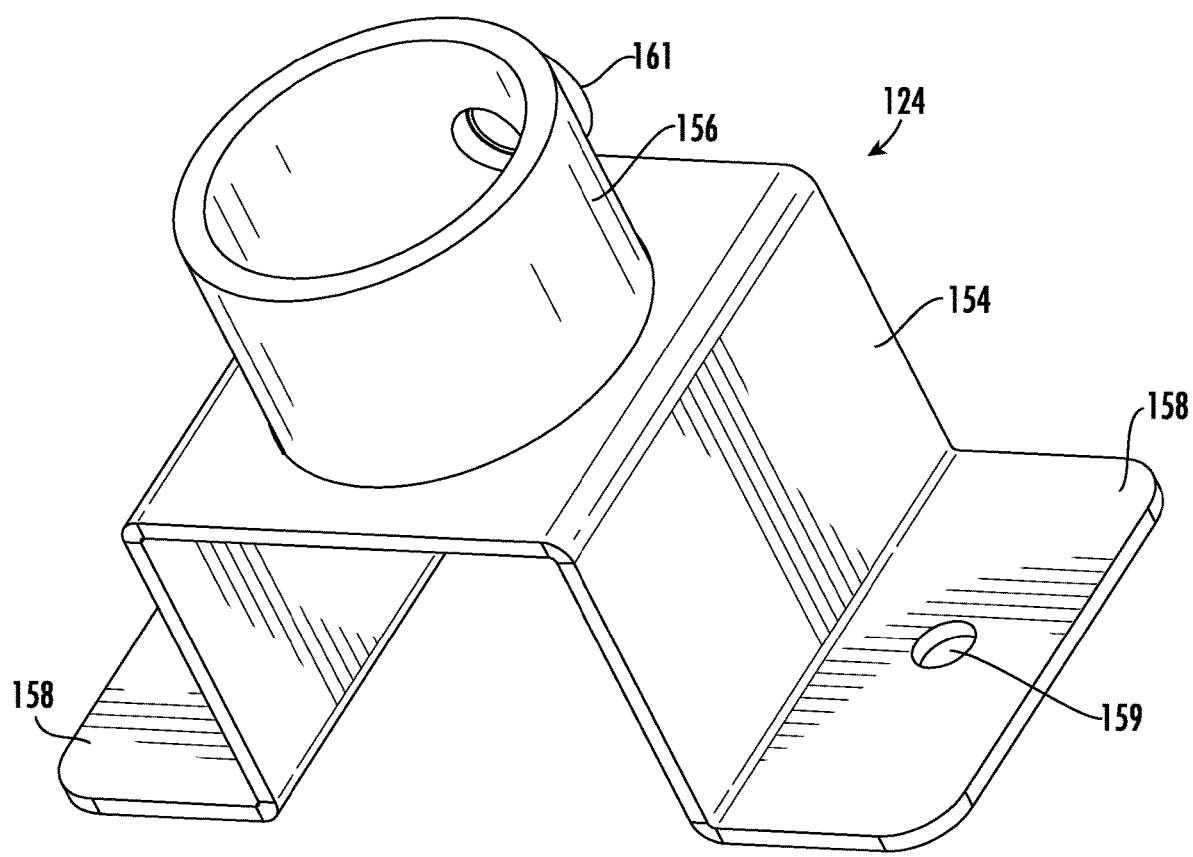
FIG. 19 illustrates another mount usable for securing a display assembly such as that shown in FIG. 1.

FIG. 19 illustrates a mount 124 that is preferred for securing the top of the support 120 in FIG. 2. The mount 124 has flanges 158 on either side of a raised rectangular portion 154 with an aperture that connects with a sleeve 156. The sleeve 156 is configured to snuggly receive the end of the support 120. If desired, an aperture 161 may be provided for a fastener to secure the mount 124 to the support 120. Apertures 159 for fasteners may be provided in any number according to the application and the weight of the display to be secured.

Figure 20:
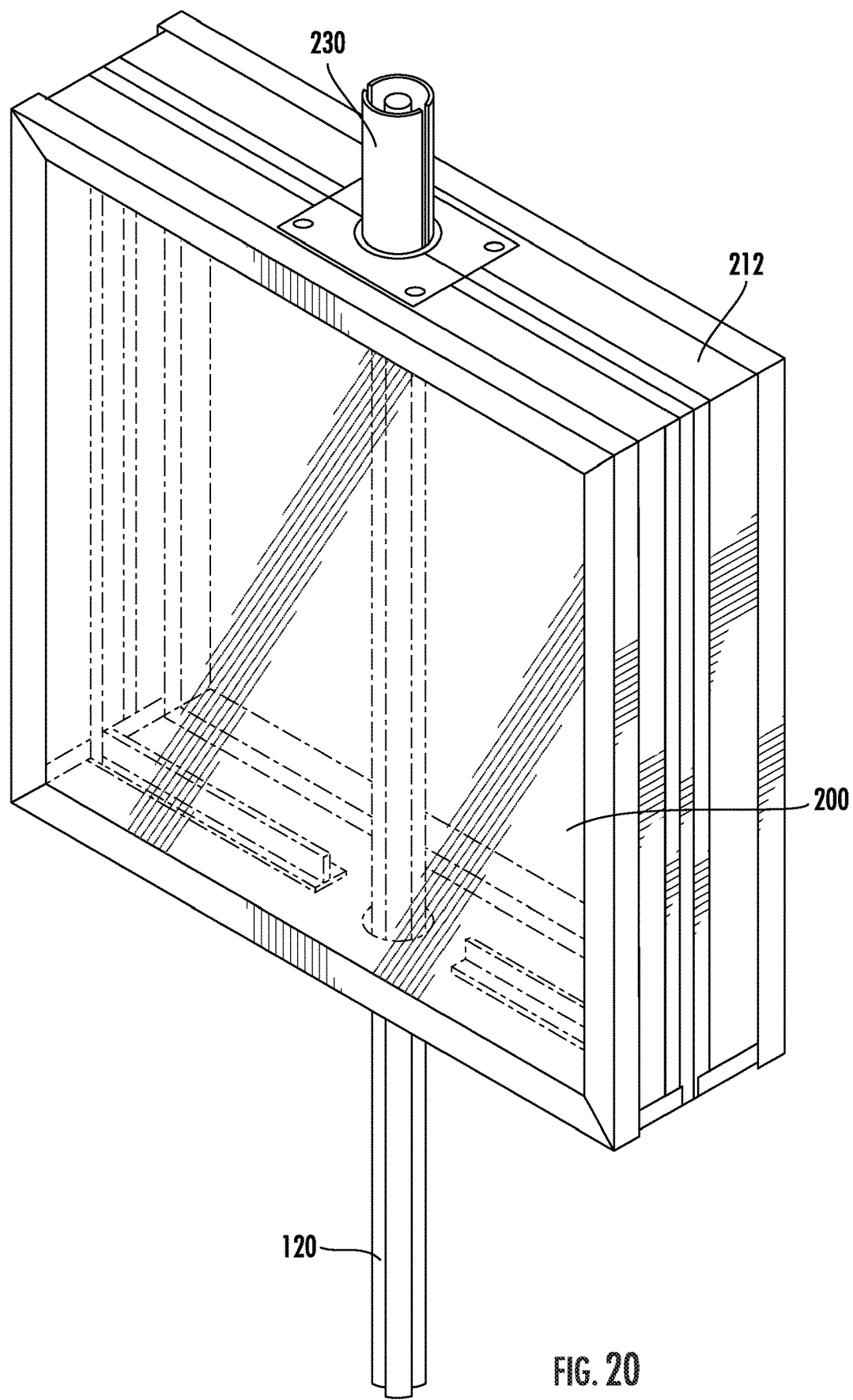
FIG. 20 illustrates a display unit utilizing a second embodiment of the mounts.

FIG. 20 illustrates an alternative embodiment of a display unit 200. This embodiment differs from the prior embodiment in that the frame 212, movable mount 230, and stationary mount 232 are constructed of multiple pieces. With this alternative construction, it is possible to assemble the display unit 200 on a previously installed support 120.

Figure 21:
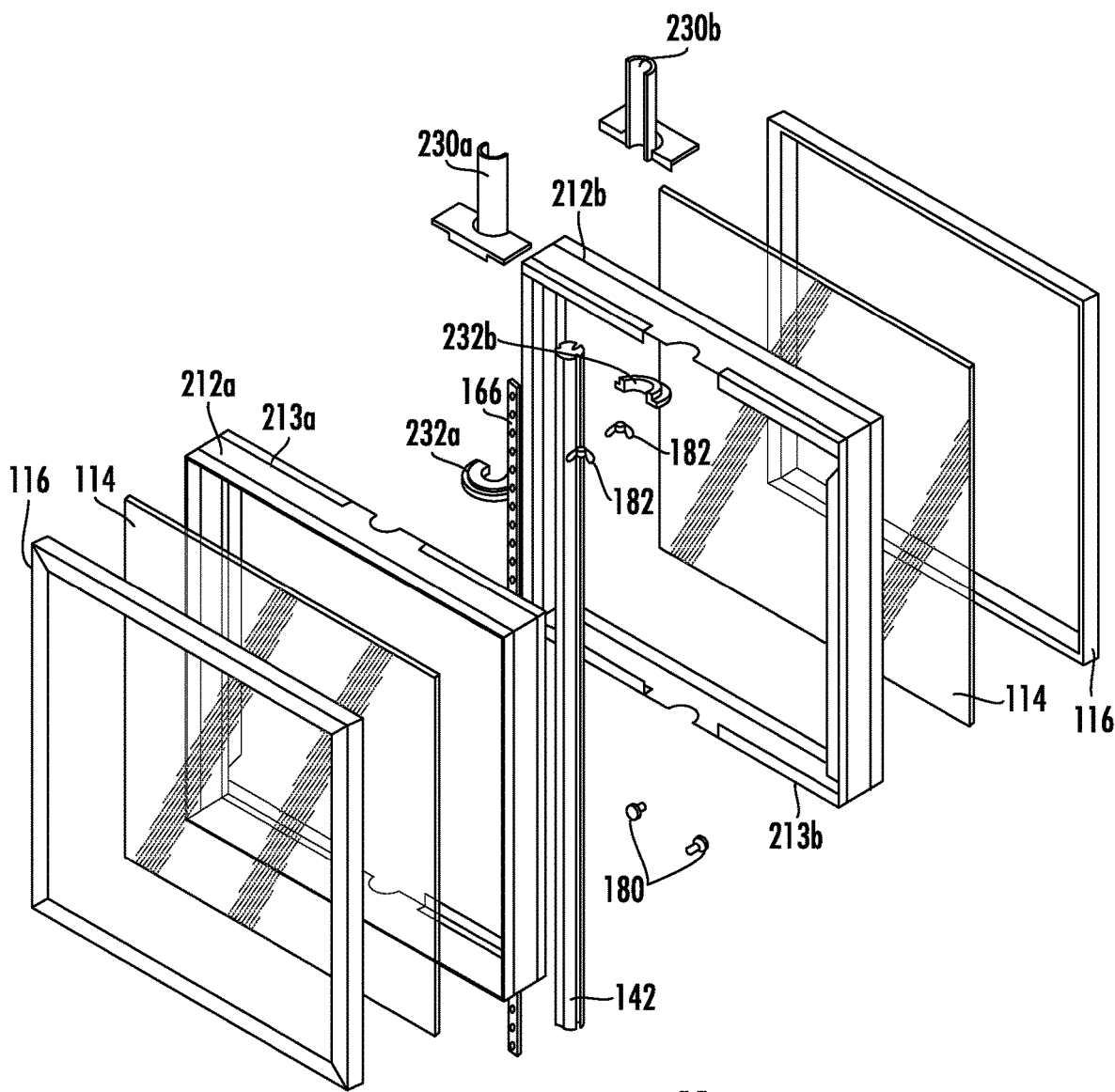
FIG. 21 is an exploded view of the display unit in FIG. 20 utilizing the second embodiment of the mounts.

FIG. 21 is an exploded view of the alternative embodiment from FIG. 20. This embodiment includes a first frame portion 212a and a second frame portion 212b. The frame portions 212a, 212b preferably have molded edges 213a, 213b that overlap and snap together, however, they may be secured with fasteners if desired. Like the prior embodiment, it is preferred that this display be movable.

Figure 22:
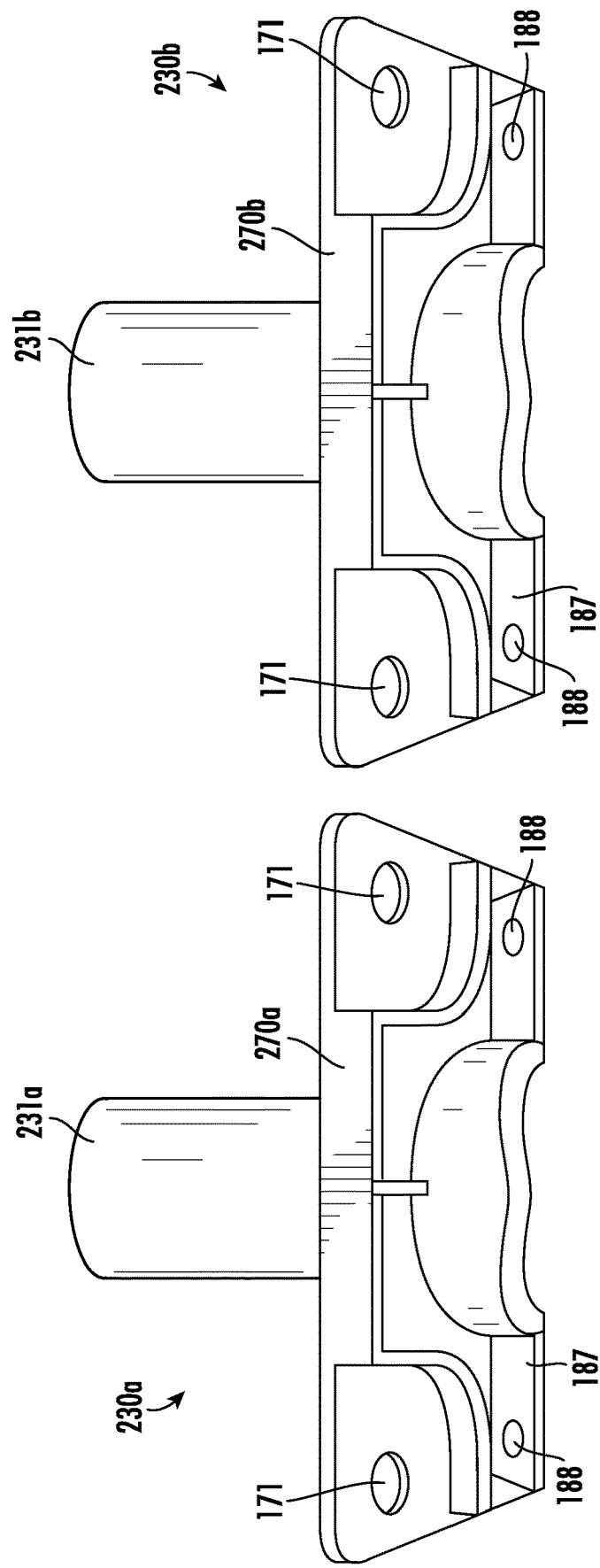
FIG. 22 is a detailed illustration of the second embodiment of a mount for attachment to a display unit.
Figure 23:
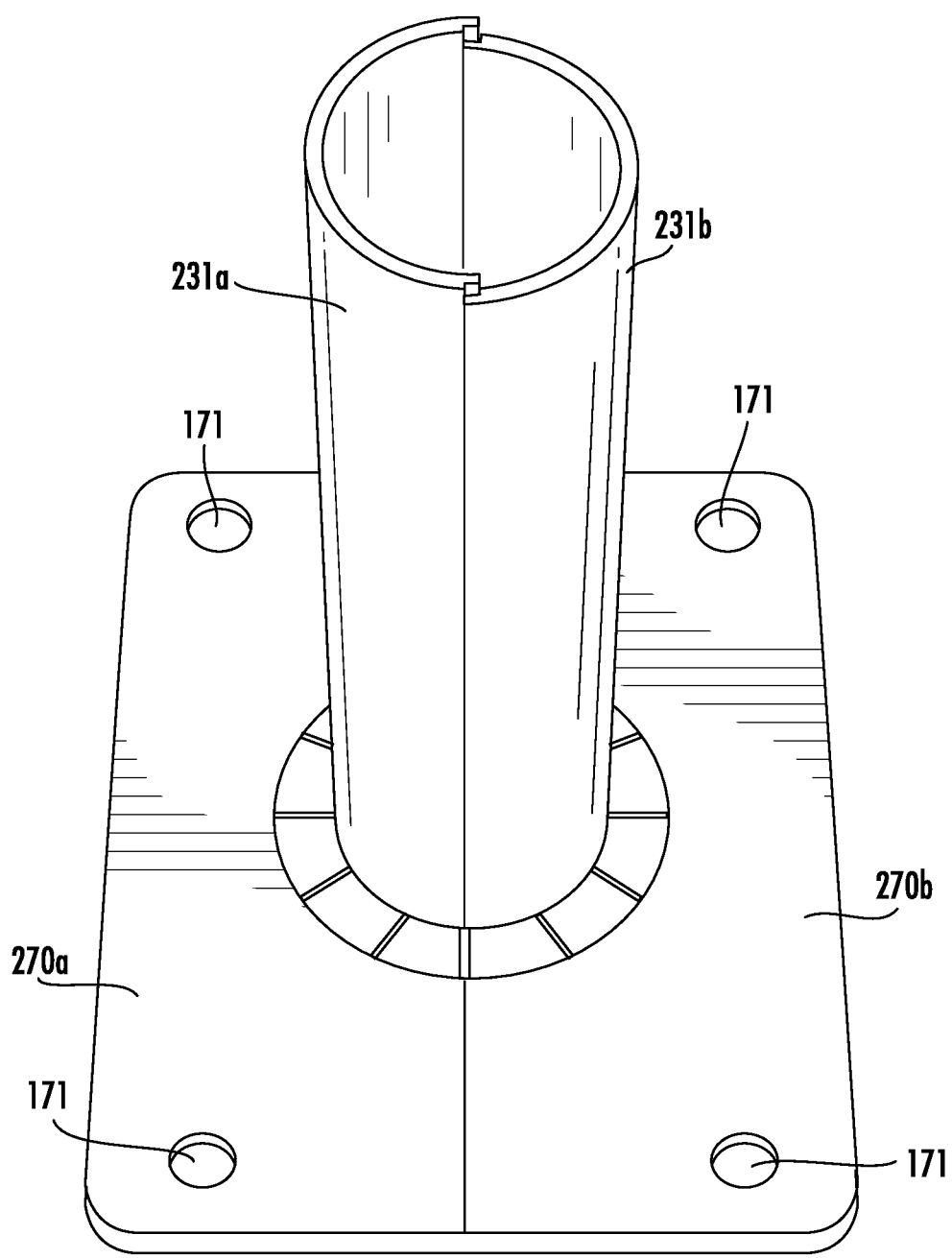
FIG. 23 illustrates an assembly of the mount portions in FIG. 22.

In this configuration, the movable mount 230, see FIGS. 21, 22, and 23, has a first portion 230a and a second portion 230b that connect together to form a sleeve, 230a and 230b, and support the two frame halves 212a and 212b.

FIGS. 22 and 23 further illustrate the mount 230 and the portions 230a, 230b which include the sleeve portions 231a, 231b configured to receive the support 120. The mount 230 also includes plates 270a, 270b that include a plurality of apertures 171 for fasteners for connecting to the frame portions 212a, 212b, shown in FIG. 20. The plate portions 270a, 270b also includes dependent flanges 187 that include apertures 188 to receive fasteners for connecting the portions 230a, 230b around the support 120. The mount 230 preferably includes a wave pattern as previously discussed.

As illustrated in FIG. 23, the free ends of the sleeve formed by sections 231a and 231b preferably include a molded snap fit, such as a rib and a recess, that provides a locking mechanism that holds them together.

Figure 24:
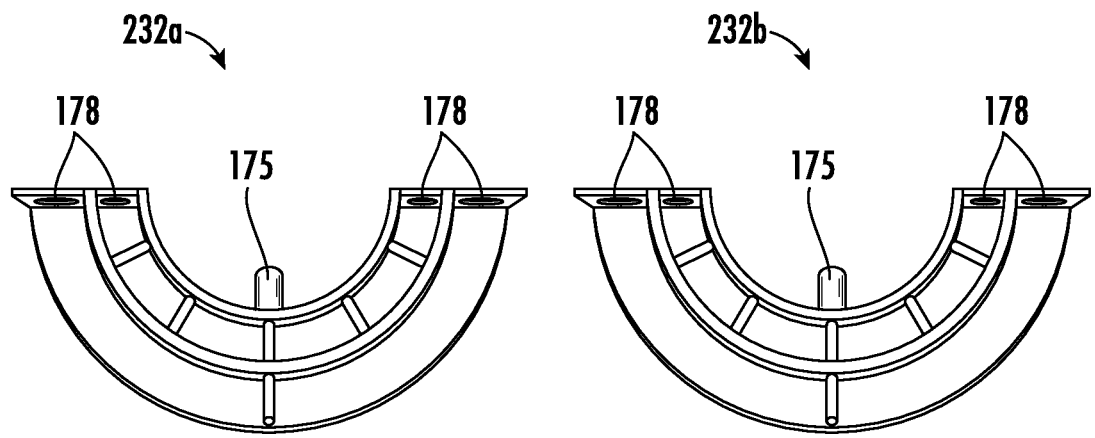
FIG. 24 is a detailed illustration of the second embodiment of a mount for attachment to a support.
Figure 25:
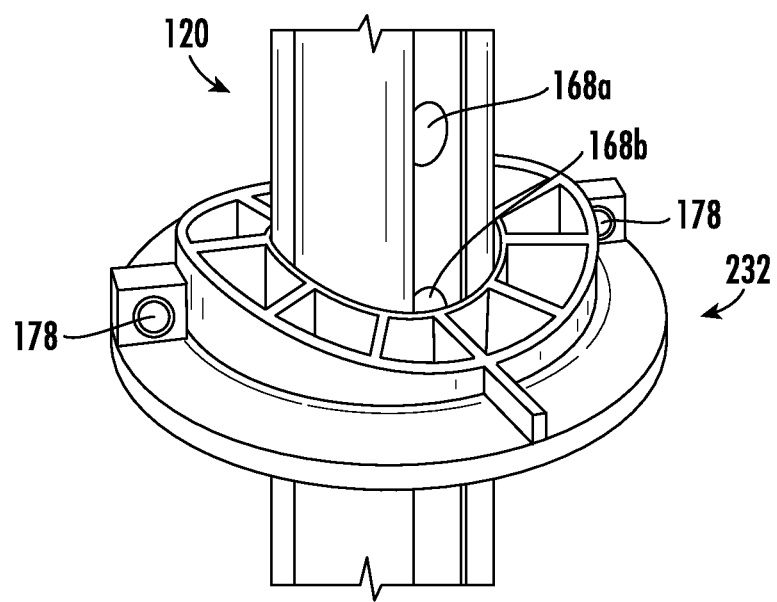
FIG. 25 illustrates an assembly of the mount portions in FIG. 24 secured to a support.

FIGS. 24 and 25 illustrate an alternative stationary mount 232 that includes a first portion 232a and a second portion 232b. At least one of the portions 232a, 232b includes a protrusion 175 that is dimensioned for insertion into a selected aperture 168a-n of the locator strip 166 to secure the stationary mount 232 at the desired position on support 120. Here again, a plurality of fasteners and apertures 178 are provided to connect the portions 232a, 232b together. The portions 232a, 232b may connect via fasteners such as screws 180 and wing nuts 182.

FIG. 25 illustrates this stationary mount 232 assembled on the support 120. As discussed previously, the surface of the stationary mount 232 preferably includes a wave or undulating pattern that complements a wave or undulating pattern on the surface of the movable mount 230.

Figure 26:
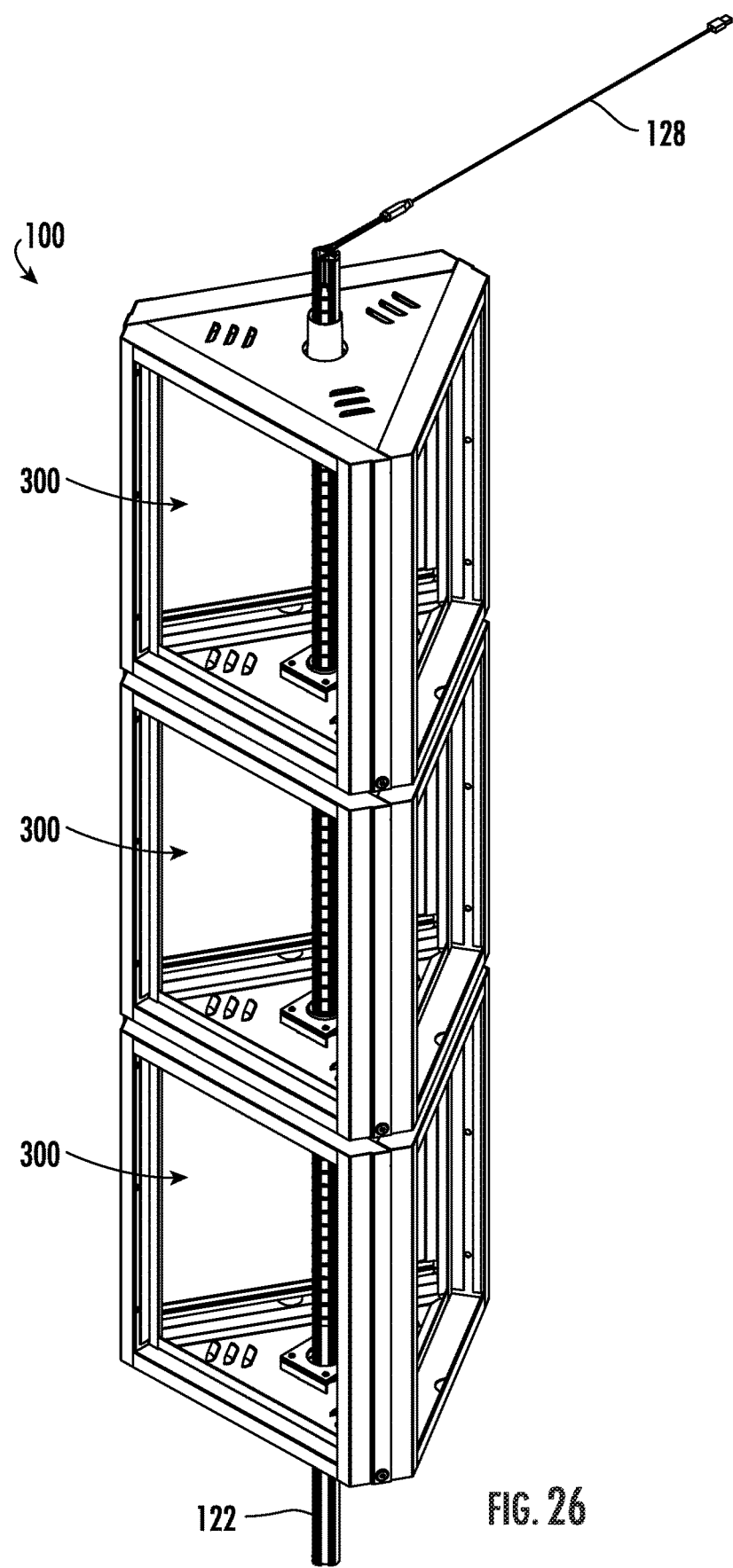
FIG. 26 illustrates a display unit utilizing a third embodiment of the mounts.

FIG. 26 illustrates an alternative embodiment of the display 100 shown in FIGS. 1 and 2. The display unit 300 in FIGS. 26-30 most visually differs in its triangular geometry from the prior display which was more rectangular. The support 122 is of the same configuration as previously discussed. FIGS. 27 to 37 illustrate the internal differences associated with the mounting components and movement of a display unit 300.

Figure 27:
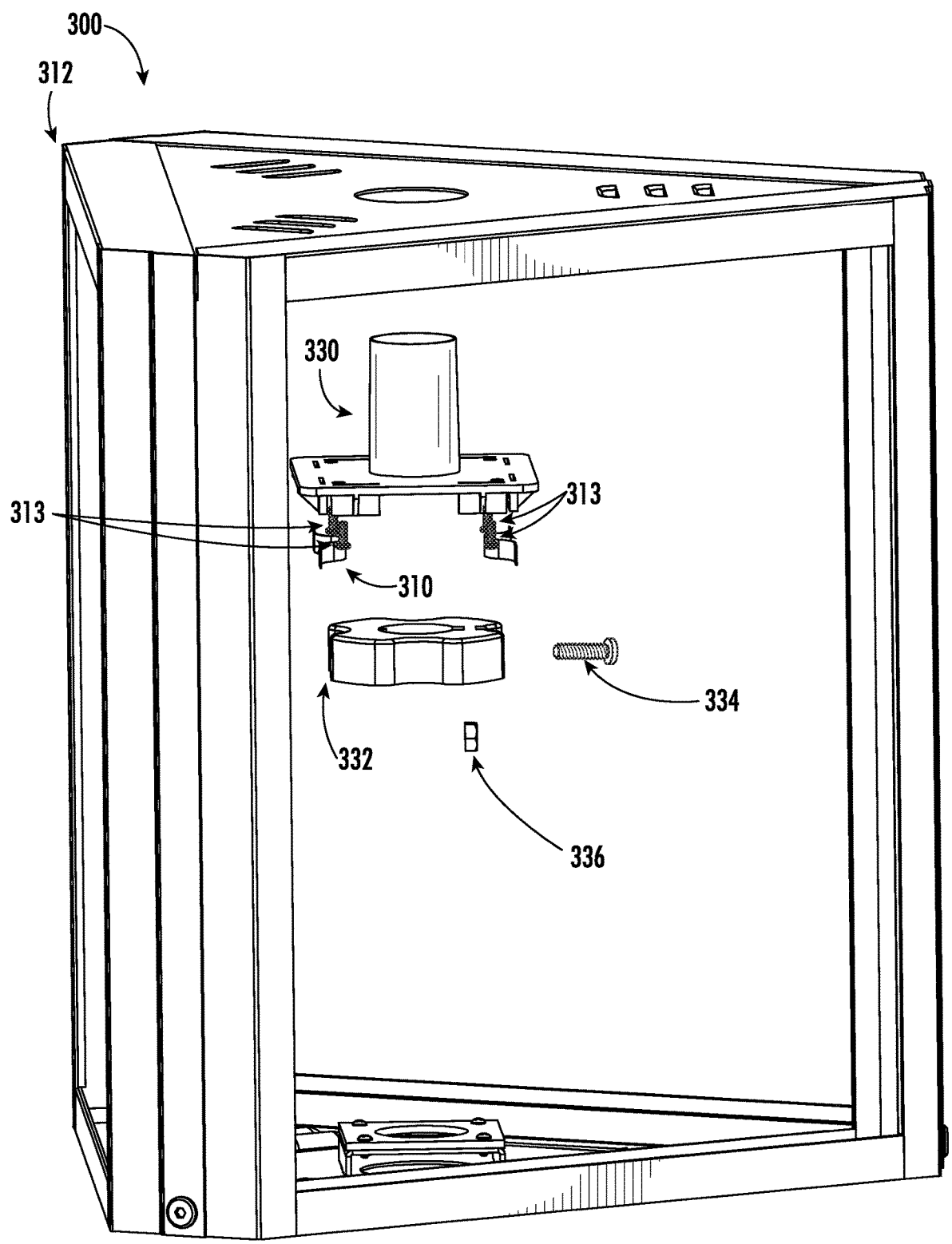
FIG. 27 is an exploded view of one display assembly from FIG. 26.
Figure 28:
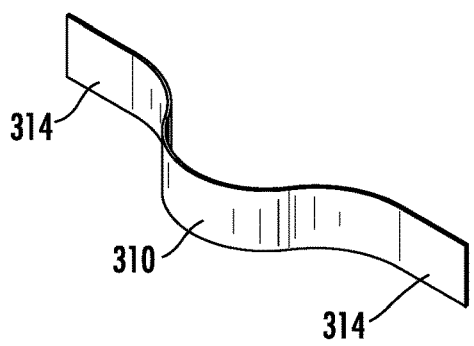
FIGS. 28 to 30 are individual views of the mounting elements of the embodiment in FIG. 27.
Figure 29:
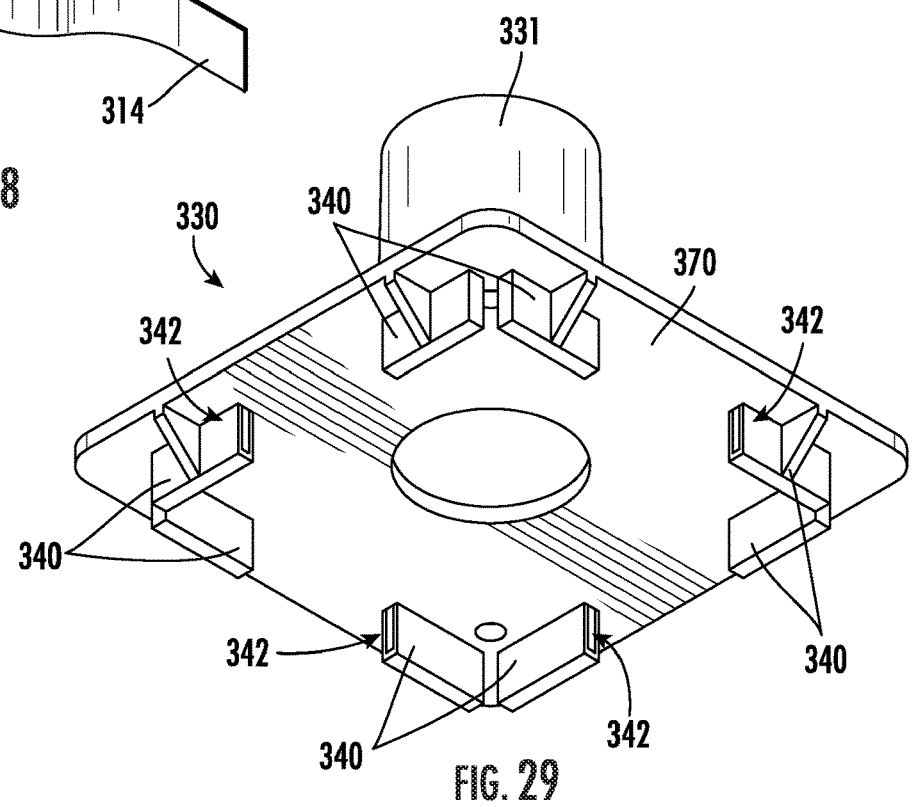
Figure 30:
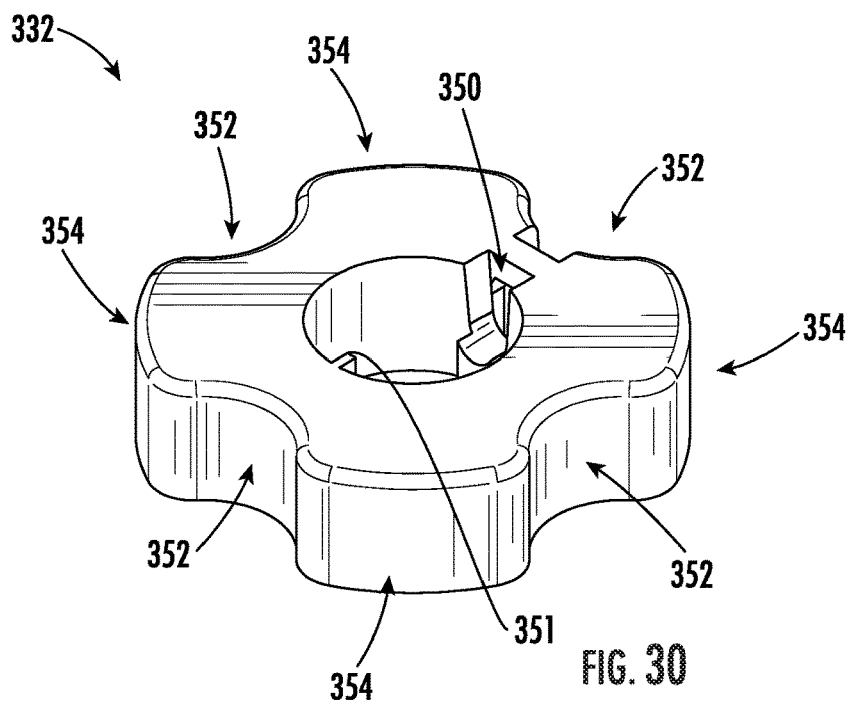

FIG. 27 illustrates an exploded triangular display unit 300 that can be mounted on a support 122. The display 300 includes a movable mount 330 that is secured to the frame 312 with a suitable fastener 313. Referring to FIGS. 28 and 29, the movable mount 330 shown in FIG. 29 includes structural elements 340 that have generally perpendicular slotted arms 342 that receive biasing members 310, such as the shaped metal spring in FIG. 28. The stationary mount 332 shown in FIG. 30 is secured to the support 122 with fasteners 334, 336 and the display unit 300 rest on the support 122. The stationary mount 332 is secured to the support 122. The stationary mount 332 and movable mount 330 are on a common center line and aligned over each other by the support 122.

With reference to FIGS. 28 and 29, the biasing member 310 has ends 314 that are configured to fit within slots 342 in holder 340 and secure the spring 310 to the movable mount 330. The middle or convex portion is positioned toward the support 122 so it faces the camming surface of stationary mount 332 and will flex to follow the recesses 352 and projects 354. The stationary mount 332 in FIG. 30 has four indentations 352 and four protrusions 354 at 90 degree increments, and the display unit 300 will rotate at 90 degree between rest positions.

With reference to FIG. 27, the movable mount 330 shown in FIG. 29 attaches to the frame 312 of the display unit 300 and the sleeve 331 extends through the frame 312. The stationary mount 332 illustrated in FIG. 30 is secured to the support 122 in the desired location with a fastener in the threaded bore 350 so it opposes the projection 351 that is in a recess formed in the support 122.

Figure 31:
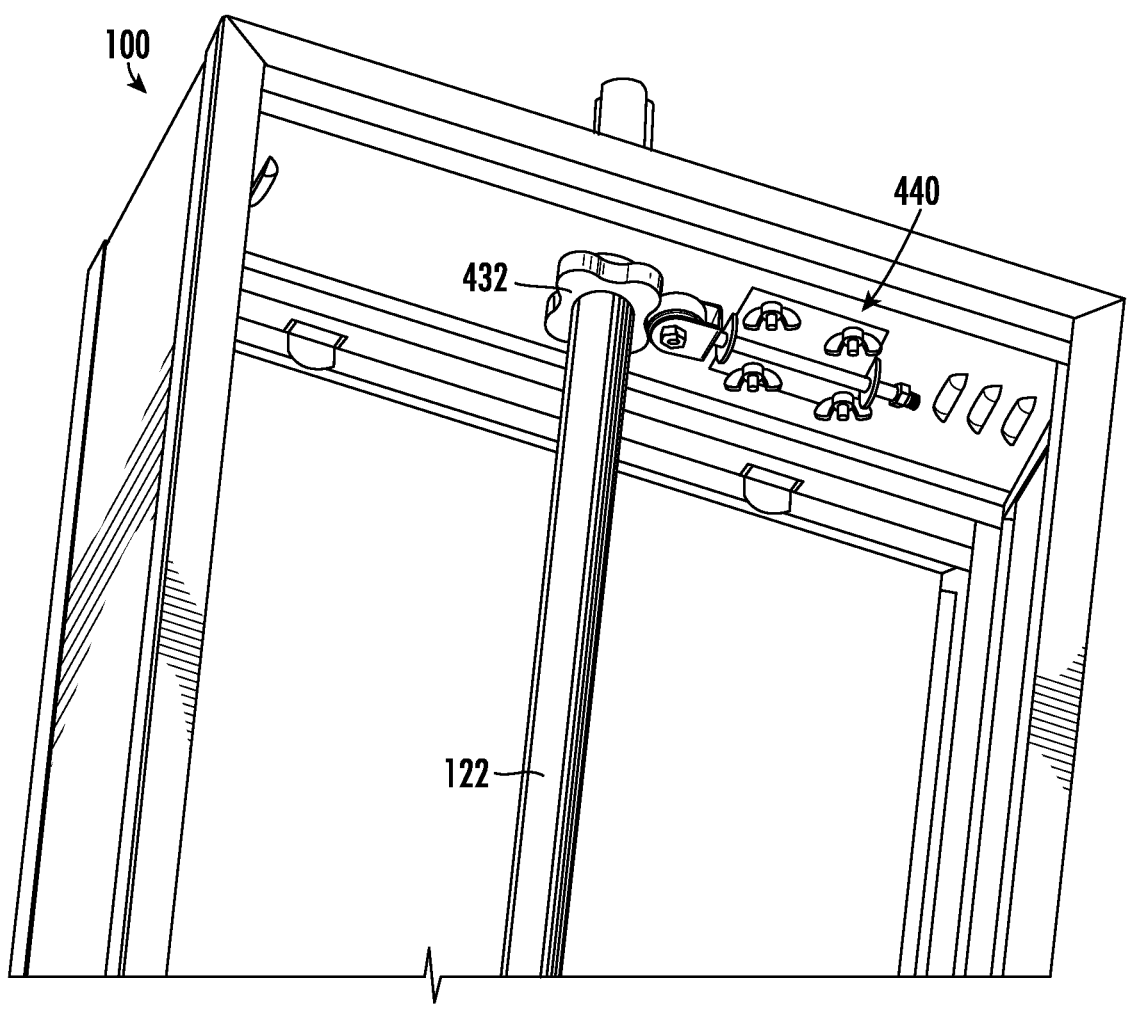
FIG. 31 illustrates a fourth embodiment of the mount control elements.

FIG. 31 illustrates a fourth embodiment of the display mount 100 that includes a stationary mount 432 on the support 122 and a roller or cam follower assembly 440. The follower assembly 440 fastens to the display unit 400 with the mounting plate 452 and tracks the alternating indentations 462 and protrusions 464, shown in FIG. 33, of the stationary mount 432.

Figure 32:
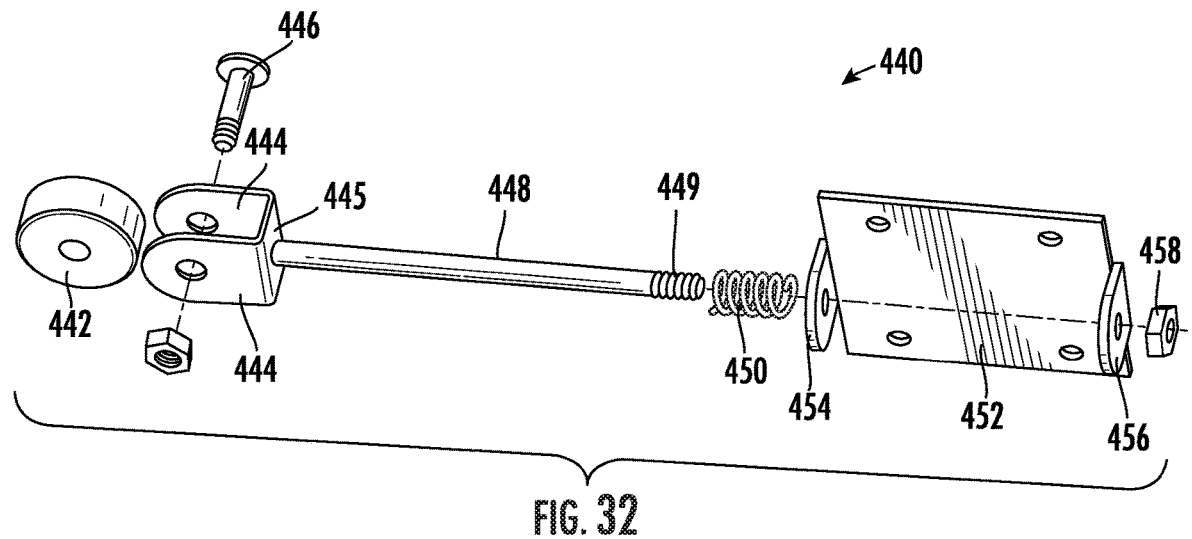

As shown in the exploded view in FIG. 32, the cam follower assembly 440 includes a roller or follower 442 that is rotatably mounted between the spaced apart end plates 444 with a shoulder bolt 446. An elongated rod or arm 448 has a threaded end 449 and is of sufficient length to extend along the length of plate 452 and pass through the dependent tabs 454 and 456. A biasing element 450, such as a compression spring, is located between the first tab 454 and the backing plate 445. The length of the threading on end 449 is of a sufficient length to permit the biasing element 450 be compressed and expanded as the follower follows the surface projections and recesses of the stationary member 432.

Figure 33:
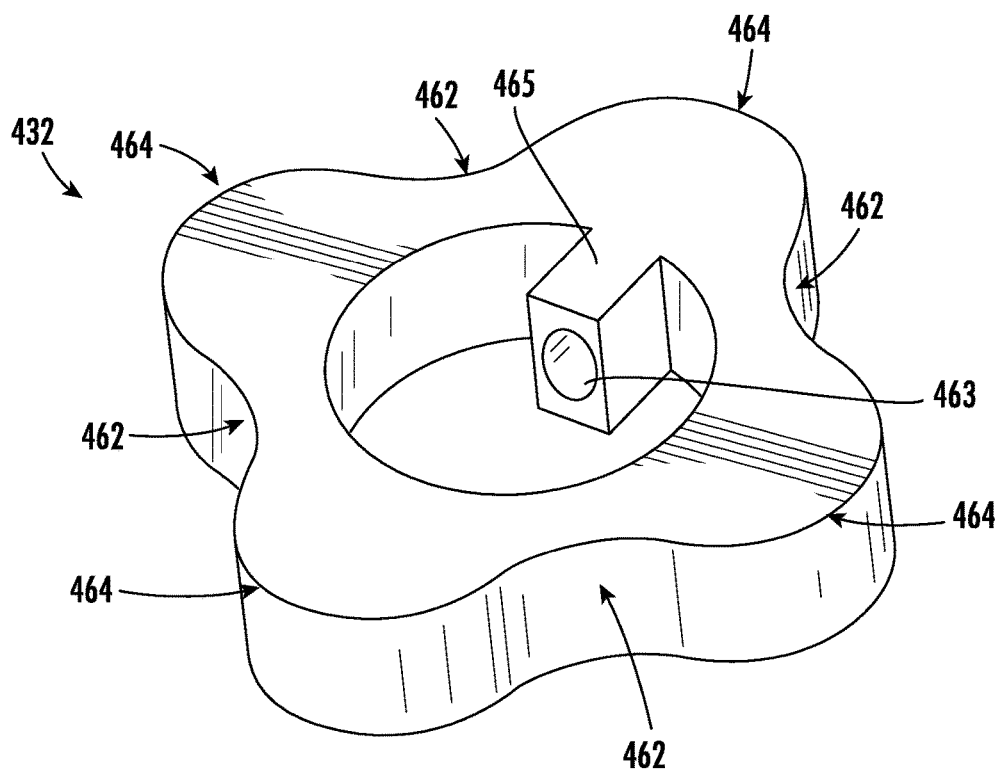
FIG. 33 is an enlarged view of the camming element in FIG. 31.
Figure 34:
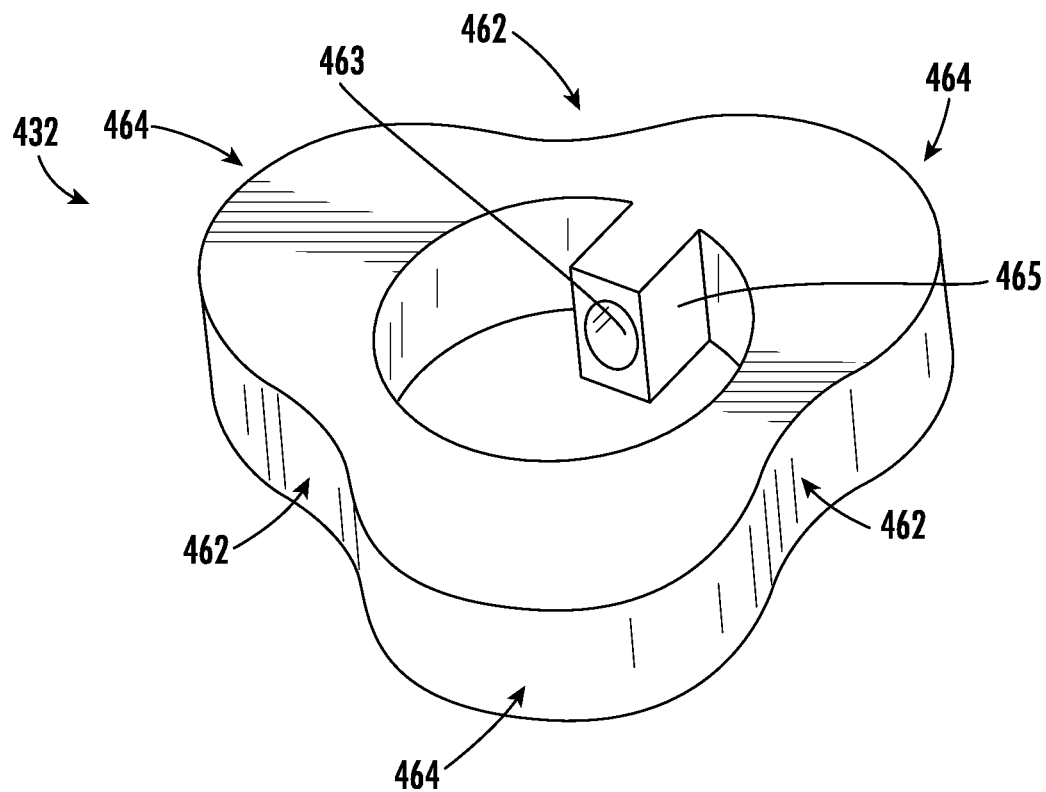
FIGS. 34 and 35 illustrate alternative configurations of the camming element shown in FIG. 31.
Figure 35:
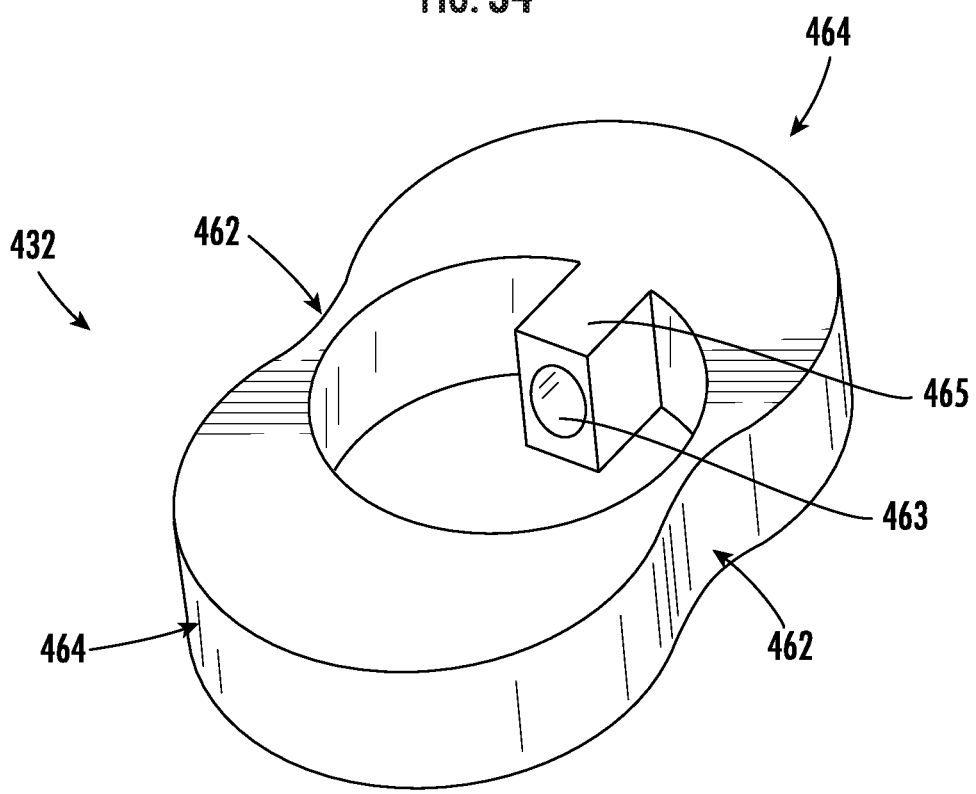

FIG. 33-35 illustrate various configurations of the stationary mount 432 with different camming surfaces of projections and recesses to cause the display rotation to be 45 degrees, 60 degrees, 90 degrees, 180 degrees or otherwise as desired. The interior projections 465 are configured to mate with a slot in support 122, and a fastener through an opening 463 in the interior projection 465. The fastener secures the stationary mount 432 to a selected aperture 168 in the locator strip 166 in the support 122, as shown in FIG. 15.

Figure 36:
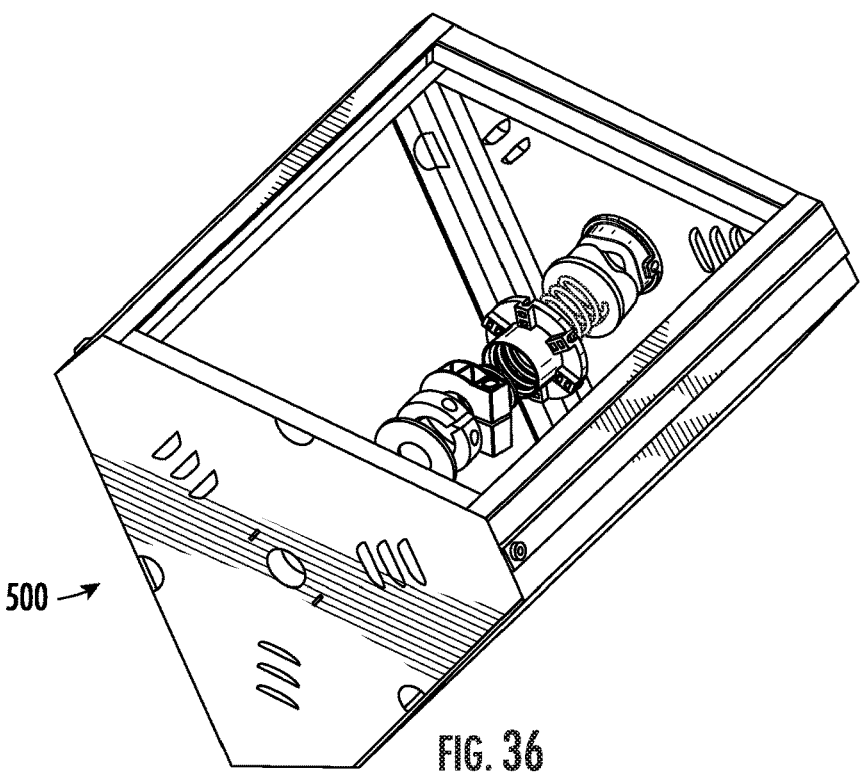
FIG. 36 illustrates a fifth embodiment suitable for use with a horizontal display.

FIG. 36 illustrates display unit 500 utilizing an embodiment of the mounts that is preferred for horizontal displays, and it is equally suitable for vertically mounted displays. The unit 500 mounting addresses the effect of gravity, which can be problematic in a horizontal configuration.

Figure 37:
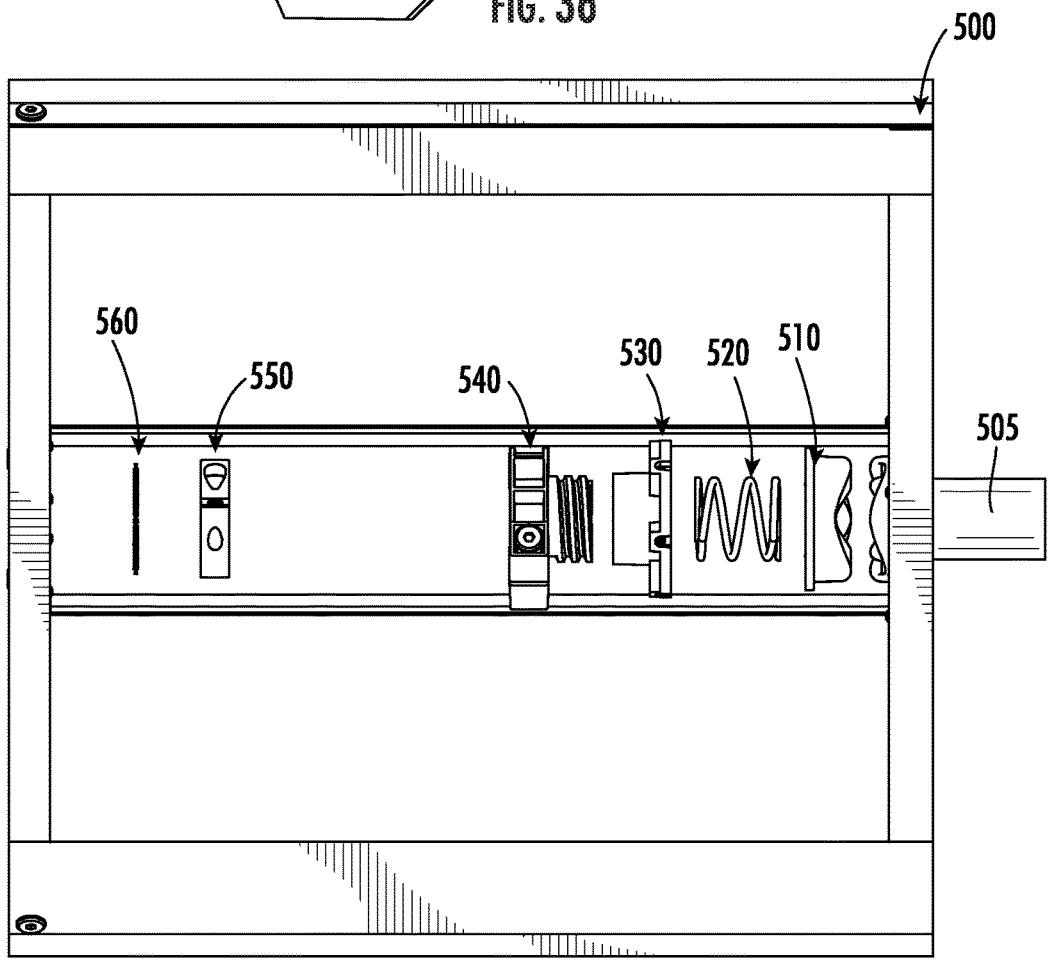
FIG. 37 is an exploded internal view of the display in FIG. 36.

FIG. 37 is an exploded view showing the mounts 505 and 510 in the embodiment of FIG. 36. The first mount 505 and the second mount 510 include substantially the same details and embodiments of the first mount 130 and second mount 132 of the first embodiment described with reference to FIGS. 4-7. In this embodiment, the second mount 510 is not fastened in a fixed location on the support 122. The second mount 510 has a project positioned within a slot of the support 122. As a result, the second mount 510 does not rotate about the support 122 but does slide along the length of support 122. The first mount 505 and second mount 510 include corresponding geometries as previously described. The first mount 505 attaches to the display unit 500 and rotates with the display unit 500. The second mount 510 is free to slide along a predetermined length of the support 122. The clamp 540 limits the travel of the mount 510.

Figure 38:
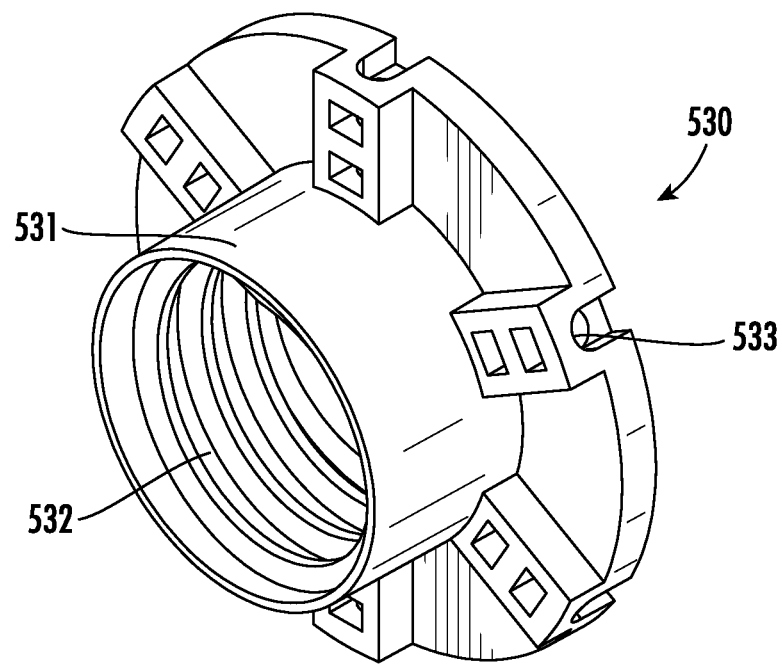
FIGS. 38 and 39 illustrate the mount components for pre-loading the biasing element in FIG. 37.
Figure 39:
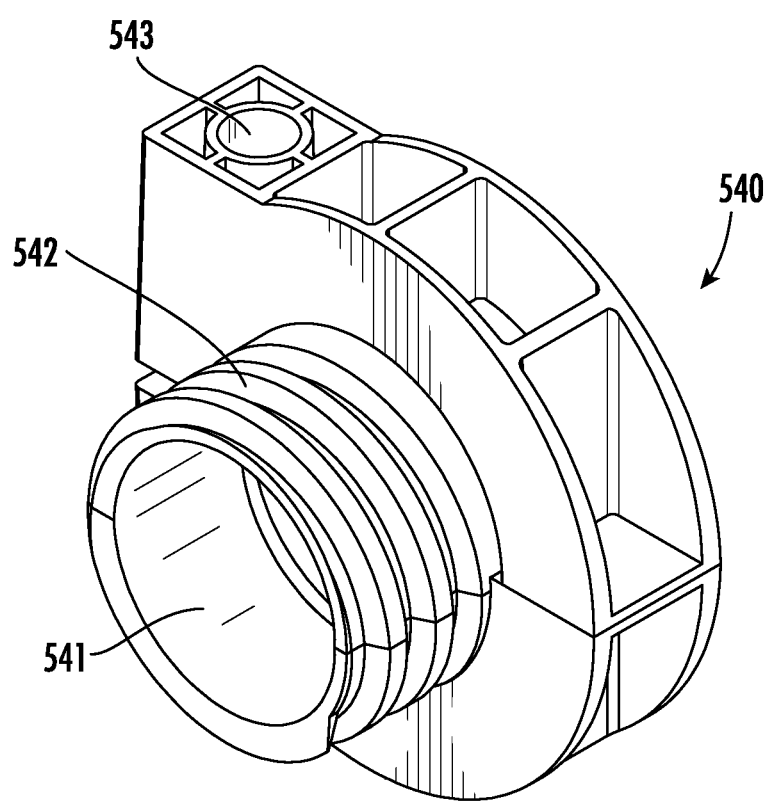

With reference to FIGS. 37-39, the display unit 500 also includes a biasing element, like spring 520, ring 530, and a clamp 540. The pole clamp 540 is secured to the support 122 in a predetermined location. The ring 530 and the clamp 540 have mating female and male projections, 531 and 541, that are threaded 532, 542 so the interconnection can be adjusted along the threading 532, 542. As shown in FIG. 37, the spring 520 is positioned between the ring 530 and the second mount 510 and floats between them. With the clamp 540 set at a predetermined distance and the threading 532 and 542 adjusted accordingly, the spring 520 is expanded to provide a predetermined resisting force against the second mount 510 to maintain contact with the first mount 505. At rest, the projections and recesses of the first mount 505 and the second mount 510 are nested. When the display unit 500 is rotated, the first mount 505 moves along the crests of the second mount 510 forcing the second mount 510 to move against the first mount 505 and the second mount 510 is forced away from the first mount 505, and the spring 520 is compressed against the ring 530. As the movement continues and the first mount 505 and the second mount 510 move toward nesting, the spring 520 expands and the display unit 500 is stopped at a predefined increment of rotation.

The opposite end of the display 500 includes a bearing ring 560 that is around the support 122 with its housing fastened to display unit 500 to align the display. The clamp 550 is fixed to the support 122 and controls movement of the display along the axis of the support 122.

FIGS. 38 and 39 are enlarged views of the ring 530 and pole clamp 540 from FIG. 37. FIG. 38 illustrates the ring 530 that is adjusted for preloading the spring 520. The ring 530 goes around support 122. Aperture 533 is used to insert a tool, such as a hex key, to assist in turning ring 530 to compress spring 520. FIG. 39 illustrates the pole clamp 540, which is shown with a split configuration to ease its installation on the support 122. One side of clamp 540 has interlocking members and the other side receives a fastener through the aperture 543. The ring 530 may also be made in a split configuration.

Figure 40:
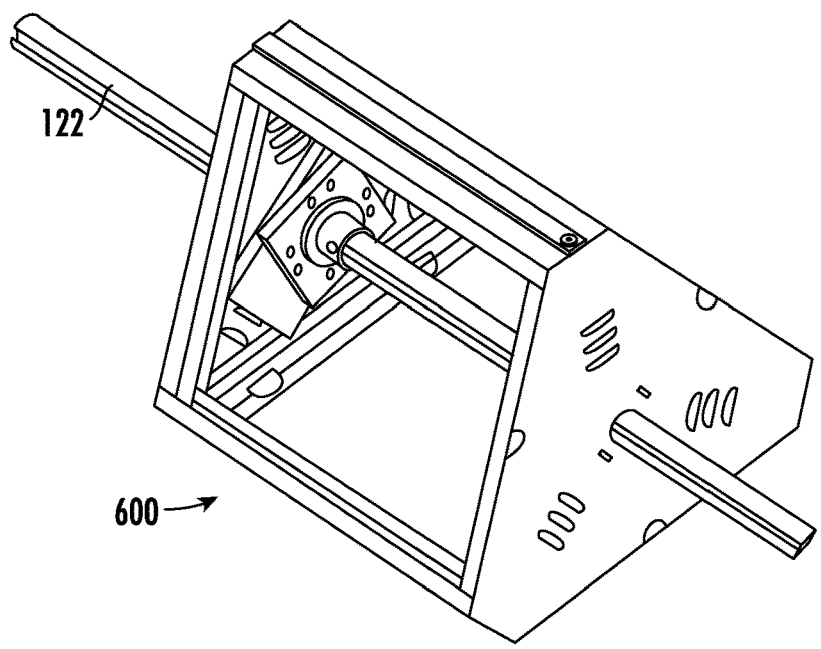
FIG. 40 illustrates a sixth embodiment suitable for use with a horizontal display.

FIG. 40 shows an alternative embodiment that can also be utilized with a horizontal display 600.

Figure 41:
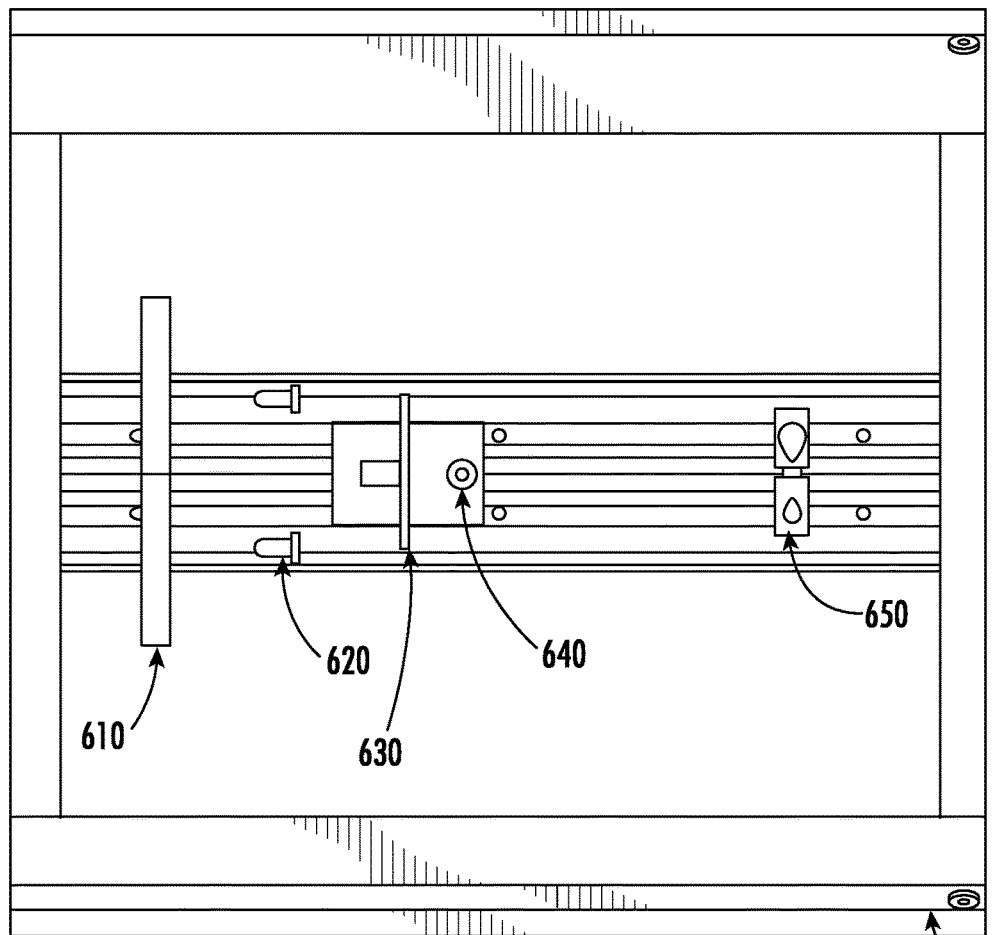
FIG. 41 is an exploded view of the display in FIG. 40.
Figure 42:
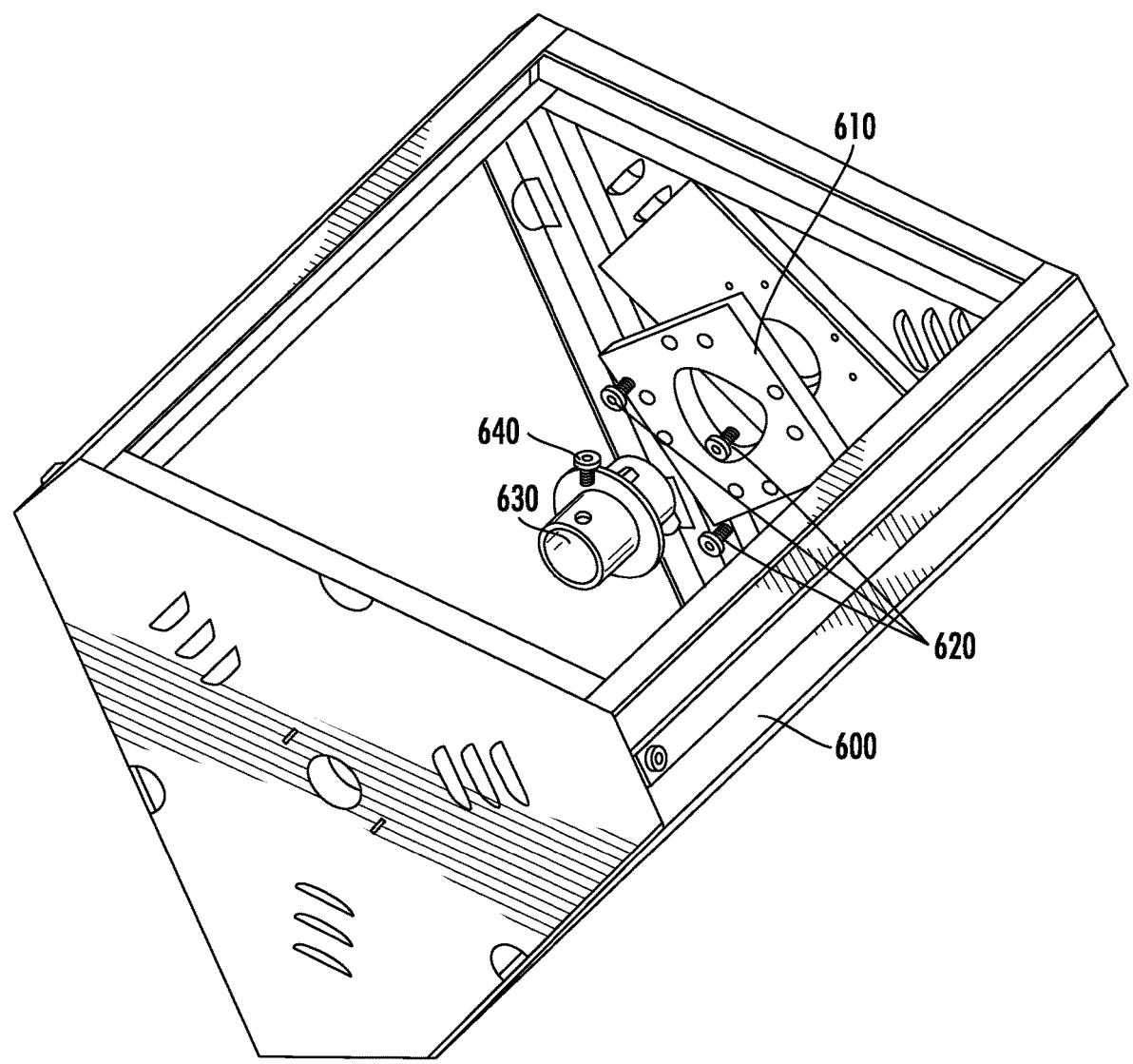
FIG. 42 is a further exploded view of the display in FIG. 40.

FIG. 41 and FIG. 42 show additional details of the configuration in FIG. 40. With reference to FIG. 42, the display unit 600 includes a first mount 610 that is secured to the display unit 600 via fasteners 620. The mount 610 has a non-circular opening that functions an interior camming surface or reverse lobes. The display unit 600 unit also includes a second mount 630 that is fixed to the support 122 via a fastener 640 and positioned in the opening 613 with a tab 638 to the camming surface of mount 610.

As the display unit 600 rotates about the supports 122, the first mount 610 rotates with the display unit 600. The fastener 640 may extend through a selected aperture 168 in the locator strip 166 of the support as shown in FIG. 15. The display unit 600 includes a clamp collar 650 that clamps onto the support 122 at the end of the display unit 600 opposite the first mount 610. The clamp collar 650 prevents the display unit 600 from sliding along the length of the support 122.

Figure 43:
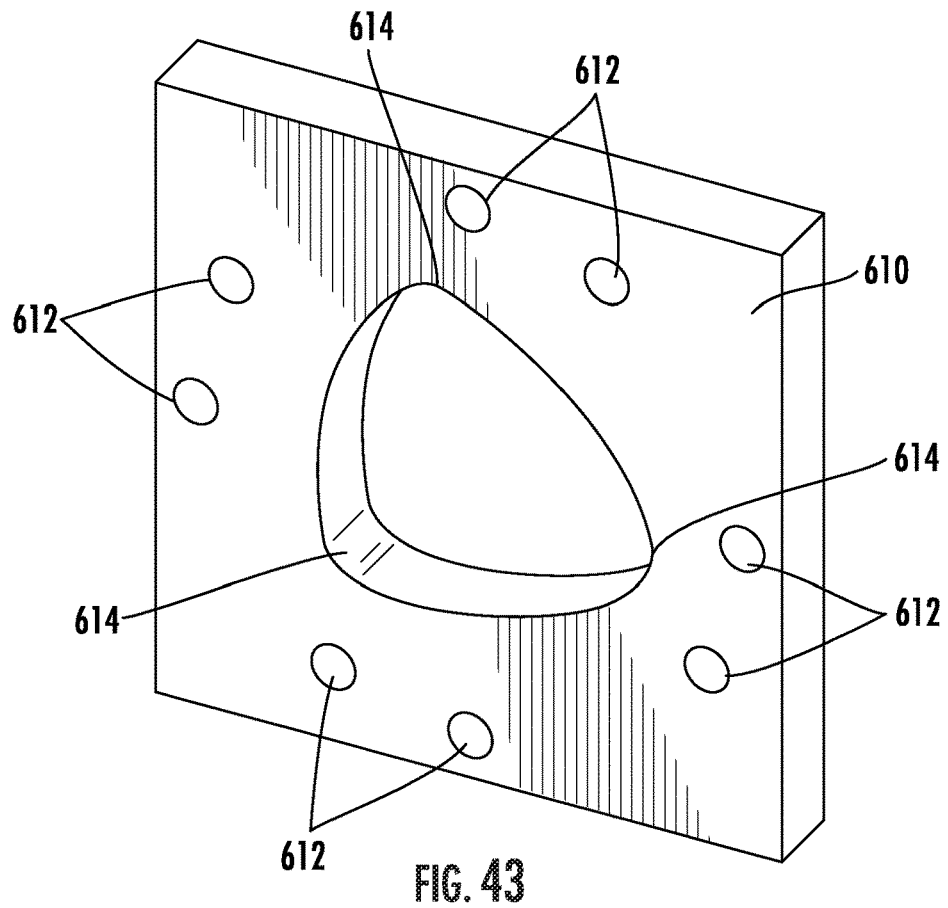
FIGS. 43 and 44 are enlarged views of the individual mounting elements in FIG. 40.
Figure 44:
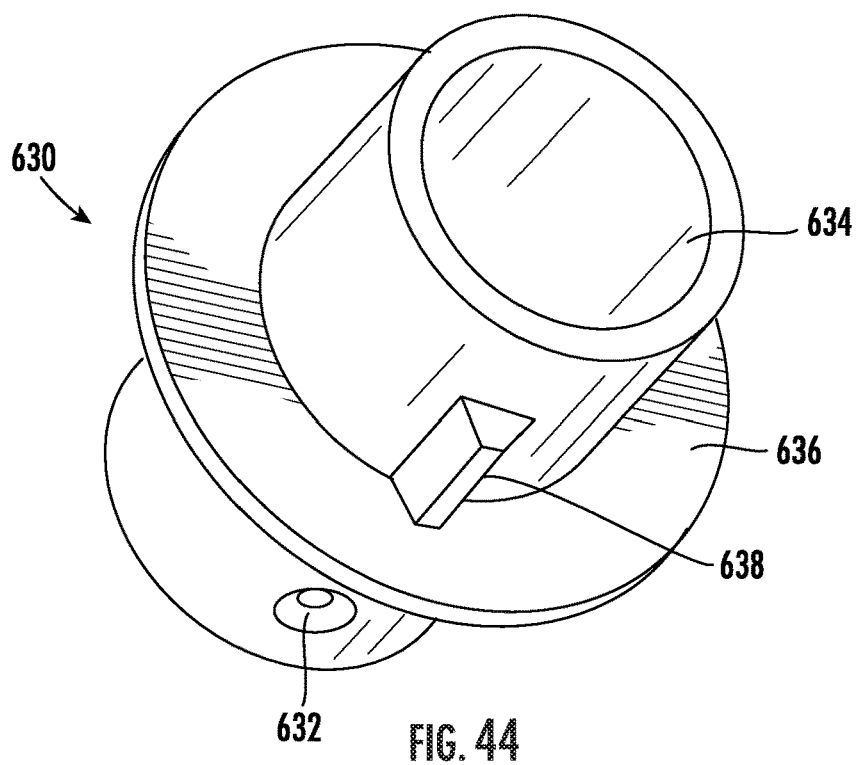

FIG. 43 and FIG. 44 are enlarged views of the first mount 610 and second mount 630 respectively. FIG. 43 shows the first mount 610 with opening 613 includes a plurality of vertices 614 numbering three in this configuration. As with the earlier displays the number of vertices 614 may be adjusted according to the desired degree of rotation.

FIG. 44 shows the second mount 630 including an aperture 632 to receive a fastener 640. The second mount 630 also includes a sleeve 634 that is sized to extend through the opening 613 in the first mount 610. The second mount 630 includes an outer plate 636 that limits travel into the opening 613 of the first mount 610. The tab 638, which indexes the second mount 630 in the first mount 610, may be of a flexible and resultant material that will deform slightly as it moves between vertices 614 and rebound to stop the rotation at a selected position. As the display 600 and first mount 610 are rotated about the second mount 630 on the support 122, the vertices 614 catch on the tab 638. If desired, tab 638 may be replaced by a biased ball detent mechanism.

What is claimed is:

1. A display assembly comprising:
   a tubular support;
   a multi-sided display;
   a mobile mount that is secured to the multi-sided display and includes at least one compressible portion; and
   a stationary mount that is positioned on the tubular support to oppose the movable mount and compress that at least one compressible element;
   wherein the tubular support has a longitudinal slot that receives a location strip with a plurality of apertures;
   whereby rotation of the mobile mount about the tubular support causes compression of the at least one compressible portion.

2. The display assembly of claim 1, wherein the mobile mount rotates with respect to the stationary mount.

3. The display assembly of claim 1, wherein the tubular support includes a lighting element that backlights the display.

4. The display assembly of claim 1, wherein the stationary mount has a circumference including indentations and protrusions.

5. A display assembly comprising:
   a tubular support;
   a multi-sided display;
   a mobile mount that is secured to the multi-sided display and includes at least one compressible portion; and
   a stationary mount that is positioned on the tubular support to oppose and compress that at least one compressible element;
   wherein the tubular support has a first longitudinal slot that receives an LED lighting element and a second longitudinal slot that receives a location strip with a plurality of apertures;
   whereby rotation of the mobile mount about the tubular support compresses the at least one compressible portion.

6. A display assembly comprising:
   a display unit;
   a support that extends through the display unit and includes a longitudinal slot with a location strip having a plurality of apertures;
   a first mount that is secured to the support;
   a second mount that is secured to the display unit; and
   a compressible assembly that is positioned between the first and second mounts and applies a coupling force to the first and second mounts so the first and second mounts are touching in one of a plurality of nested positions;
   whereby rotation of the display unit overcomes the coupling force and enables movement of the display to another one of the plurality of nested positions.

7. The display assembly of claim 6, wherein the compressible assembly includes a spring.

8. The display assembly of claim 6, wherein the support includes a lighting element that backlights the display.

9. A display assembly comprising:
   a display unit;
   a support that extends through the display unit;
   a first mount that is secured to the support;
   a second mount that is secured to the display unit; and
   a compressible assembly that is positioned between the first and second mounts and applies a coupling force to the first and second mounts so the first and second mounts are coupled in one of a plurality of nested positions;
   wherein the support has a first longitudinal slot that receives an LED lighting element and a second longitudinal slot that receives a location strip with a plurality of apertures;
   whereby rotation of the display unit overcomes the coupling force and enables movement of the display to another one of the plurality of nested positions.

10. A display assembly comprising:
    a tubular support that includes a longitudinal slot with a strip for positioning a display on the tubular support;
    a display unit with a mobile mount that includes at least one compressible portion; and
    a stationary mount that secures the display along the longitudinal slot in the tubular support and opposes the movable mount;
    whereby rotation of the mobile mount about the tubular support causes compression of the at least one compressible portion.

* * * * *